United States Patent
Park et al.

(10) Patent No.: US 8,428,874 B2
(45) Date of Patent: Apr. 23, 2013

(54) METHOD FOR SEARCHING DESTINATION OF TREE STRUCTURE AND SYSTEM THEREOF

(75) Inventors: Eun-Young Park, Seoul (KR); Myung Sik Kim, Gyeonggi-do (KR); Ji Sun Jo, Seoul (KR); Sang Hun Chang, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 754 days.

(21) Appl. No.: 12/530,250

(22) PCT Filed: Dec. 27, 2007

(86) PCT No.: PCT/KR2007/006856
§ 371 (c)(1),
(2), (4) Date: Sep. 8, 2009

(87) PCT Pub. No.: WO2008/108532
PCT Pub. Date: Sep. 12, 2008

(65) Prior Publication Data
US 2010/0106400 A1    Apr. 29, 2010

(30) Foreign Application Priority Data
Mar. 7, 2007   (KR) .................. 10-2007-0022566

(51) Int. Cl.
*G01C 21/34*   (2006.01)
(52) U.S. Cl.
USPC ........... 701/438; 701/418; 701/410; 701/461; 701/532; 701/542; 701/527; 715/738; 715/754
(58) Field of Classification Search .................. 701/438, 701/410, 461, 532, 533, 540, 527, 418; 715/738, 715/854
See application file for complete search history.

(56) References Cited

U.S. PATENT DOCUMENTS

| | | | |
|---|---|---|---|
| 6,772,142 B1 * | 8/2004 | Kelling et al. | 701/454 |
| 7,860,647 B2 * | 12/2010 | Amano | 701/414 |
| 2004/0153238 A1 * | 8/2004 | Miyahara | 701/207 |
| 2005/0033511 A1 * | 2/2005 | Pechatnikov et al. | 701/210 |
| 2005/0131631 A1 * | 6/2005 | Nakano et al. | 701/200 |
| 2005/0149253 A1 * | 7/2005 | Nambata | 701/201 |
| 2005/0283503 A1 | 12/2005 | Hancock et al. | |
| 2006/0064243 A1 * | 3/2006 | Hirose | 701/211 |
| 2007/0106468 A1 * | 5/2007 | Eichenbaum et al. | 701/211 |

FOREIGN PATENT DOCUMENTS

| | | |
|---|---|---|
| EP | 1612707 A2 | 1/2006 |
| KR | 10-2001-0102890 | 11/2001 |
| KR | 10-2004-0028076 | 4/2004 |
| KR | 10-2004-0038056 | 5/2004 |

(Continued)

OTHER PUBLICATIONS

International Search Report for PCT/KR2007/006856 mailed Mar. 24, 2008.
Written Opinion for PCT/KR2007/006856 mailed Mar. 24, 2008.
Supplementary European Search Report issued by the European Patent Office on Apr. 23, 2010 for the corresponding European Patent Application No. 07860675.3.
Birgit Elias Ed.; Anonymous; Pedestrian Navigation—Creating a tailored geodatabase for routing; Positioning, Navigation and Communication, 2007; WPNC '07, 4th Workshop On, IEEE, PI, Mar. 1, 2007; pp. 41-47; XP031080615.

*Primary Examiner* — Joseph Rocca
*Assistant Examiner* — George Spisich
(74) *Attorney, Agent, or Firm* — Nixon & Vanderhye PC

(57) ABSTRACT

A destination retrieving method including: analyzing map data to define a relation between points of interest (POIs) as a POI relation; and providing a search result in the tree structure based on the POI relation when retrieving a destination name is provided.

12 Claims, 48 Drawing Sheets

FOREIGN PATENT DOCUMENTS

| KR | 10-2004-0064868 | 7/2004 |
| WO | 95/04340 | 2/1995 |
| WO | 02/063853 A2 | 8/2002 |
| WO | 03/063521 A2 | 7/2003 |

* cited by examiner

FIG. 12

| ID | NAME | TYPE | DP |
|----|------|------|-----|
| 1 | JINJOO APT | APARTMENT | Y |
| 2 | JINJOO APT ENTRANCE (3 DISTRICT) | ENTRANCE | N |
| 3 | JINJOO APT ENTRANCE (7 DISTRICT) | ENTRANCE | N |
| 4 | JINJOO APT ENTRANCE (11 DISTRICT) | ENTRANCE | N |
| 5 | JINJOO APT ENTRANCE (13 DISTRICT) | ENTRANCE | N |

FIG. 13

| PID | CID | TREE NAME | SEARCH FLAG |
|-----|-----|-----------|-------------|
| 1 | 2 | 3 DISTRICT ENTRANCE | INDEPENDENT SEARCH |
| 1 | 3 | 7 DISTRICT ENTRANCE | INDEPENDENT SEARCH |
| 1 | 4 | 11 DISTRICT ENTRANCE | INDEPENDENT SEARCH |
| 1 | 5 | 13 DISTRICT ENTRANCE | REPRESENTATIVE SEARCH |

FIG. 16

| ID | NAME | TYPE | DP |
|---|---|---|---|
| 1 | DAESANG TOWN HYUNDAI APT | APARTMENT | Y |
| 2 | DAESANG TOWN HYUNDAI APT ENTRANCE (104 DISTRICT) | ENTRANCE | N |
| 3 | DAESANG TOWN HYUNDAI APT ENTRANCE (108 DISTRICT) | ENTRANCE | N |
| 4 | DAESANG TOWN HYUNDAI APT ENTRANCE (201 DISTRICT) | ENTRANCE | N |
| 5 | DAESANG TOWN HYUNDAI APT ENTRANCE (208 DISTRICT) | ENTRANCE | N |

FIG. 17

| PID | CID | TREE NAME | SEARCH FLAG |
|---|---|---|---|
| 1 | 2 | 104 DISTRICT ENTRANCE | REPRESENTATIVE SEARCH |
| 1 | 3 | 108 DISTRICT ENTRANCE | INDEPENDENT SEARCH |
| 1 | 4 | 201 DISTRICT ENTRANCE | INDEPENDENT SEARCH |
| 1 | 5 | 208 DISTRICT ENTRANCE | INDEPENDENT SEARCH |

FIG. 20

| ID | NAME | TYPE | DP |
|---|---|---|---|
| 1 | OLYMPUS GOLDEN APT | APARTMENT | Y |
| 2 | OLYMPUS GOLDEN APT ENTRANCE (1 DISTRICT) | ENTRANCE | N |
| 3 | OLYMPUS GOLDEN APT ENTRANCE (2 DISTRICT) | ENTRANCE | N |
| 4 | OLYMPUS GOLDEN APT ENTRANCE (3 DISTRICT) | ENTRANCE | N |
| 5 | OLYMPUS GOLDEN APT ENTRANCE (4 DISTRICT) | ENTRANCE | N |

FIG. 21

| PID | CID | TREE NAME | SEARCH FLAG |
|---|---|---|---|
| 1 | 2 | 1 DISTRICT ENTRANCE | INDEPENDENT SEARCH |
| 1 | 3 | 2 DISTRICT ENTRANCE | INDEPENDENT SEARCH |
| 1 | 4 | 3 DISTRICT ENTRANCE | REPRESENTATIVE SEARCH |
| 1 | 5 | 4 DISTRICT ENTRANCE | INDEPENDENT SEARCH |
| 1 | 6 | 5 DISTRICT ENTRANCE | INDEPENDENT SEARCH |

FIG. 25

| ID | NAME | TYPE | DP |
|----|------|------|-----|
| 1 | LOTTE DEPARTMENT STORE GWANAK BRANCH | DEPARTMENT STORE | Y |
| 2 | LOTTE DEPARTMENT STORE GWANAK BRANCH PARKING LOT ENTRANCE | ENTRANCE, VEHICLE ENTRANCE | N |
| 3 | LOTTE DEPARTMENT STORE GWANAK BRANCH PARKING LOT EXIT | ENTRANCE, VEHICLE EXIT | N |
| 4 | LOTTE DEPARTMENT STORE GWANAK BRANCH MAIN ENTRANCE | ENTRANCE FOR HUMAN BEINGS | N |

FIG. 26

| PID | CID | TREE NAME | SEARCH FLAG |
|-----|-----|-----------|-------------|
| 1 | 2 | PARKING LOT ENTRANCE | REPRESENTATIVE SEARCH |
| 1 | 3 | PARKING LOT EXIT | INDEPENDENT SEARCH |
| 1 | 4 | MAIN ENTRANCE | INDEPENDENT SEARCH |

FIG. 29

| ID | NAME | TYPE | DP |
|---|---|---|---|
| 1 | MYEONGIN ELEMENTARY SCHOOL | ELEMENTARY SCHOOL | Y |
| 2 | MYEONGIN ELEMENTARY SCHOOL ENTRANCE | ENTRANCE | N |

FIG. 30

| PID | CID | TREE NAME | SEARCH FLAG |
|---|---|---|---|
| 1 | 2 | ENTRANCE | REPRESENTATIVE SEARCH |

FIG. 33

| ID | NAME | TYPE | DP |
|---|---|---|---|
| 1 | HWAYANG ELEMENTARY SCHOOL | ELEMENTARY SCHOOL | Y |
| 2 | HWAYANG ELEMENTARY SCHOOL MAIN ENTRANCE | ENTRANCE | N |
| 3 | HWAYANG ELEMENTARY SCHOOL BACK GATE | ENTRANCE | N |

FIG. 34

| PID | CID | TREE NAME | SEARCH FLAG |
|---|---|---|---|
| 1 | 2 | MAIN ENTRANCE | REPRESENTATIVE SEARCH |
| 1 | 3 | BACK GATE | INDEPENDENT SEARCH |

FIG. 37

| ID | NAME | TYPE | DP |
|----|------|------|----|
| 1 | WOORIM MARKET | MARKET | Y |
| 2 | WOORIM MARKET ENTRANCE | ENTRANCE | N |

FIG. 38

| PID | CID | TREE NAME | SEARCH FLAG |
|-----|-----|-----------|-------------|
| 1 | 2 | ENTRANCE | REPRESENTATIVE SEARCH |

FIG. 40

| ID | NAME | TYPE | DP |
|---|---|---|---|
| 1 | WONJU IC | IC | Y |
| 2 | WONJU IC SEOUL DIRECTION | ENTRANCE | N |
| 3 | WONJU IC GANGNEUNG DIRECTION | ENTRANCE | N |
| 4 | WONJU IC EXIT | ENTRANCE | N |

FIG. 41

| PID | CID | TREE NAME | SEARCH FLAG |
|---|---|---|---|
| 1 | 2 | SEOUL DIRECTION | INDEPENDENT SEARCH |
| 1 | 3 | GANGNEUNG DIRECTION | INDEPENDENT SEARCH |
| 1 | 4 | EXIT | REPRESENTATIVE SEARCH |

FIG. 44

| ID | NAME | TYPE | DP |
|----|------|------|-----|
| 1 | GYEYANG IC | IC | Y |
| 2 | GYEYANG IC PANGYO DIRECTION | ENTRANCE | N |
| 3 | GYEYANG IC ILSAN DIRECTION | ENTRANCE | N |
| 4 | GYEYANG IC EXIT (BUCHEON DIRECTION) | ENTRANCE | N |
| 5 | GYEYANG IC EXIT (GYEYANG DIRECTION) | ENTRANCE | N |

FIG. 45

| PID | CID | TREE NAME | SEARCH FLAG |
|-----|-----|-----------|-------------|
| 1 | 2 | PANGYO DIRECTION | INDEPENDENT SEARCH |
| 1 | 3 | ILSAN DIRECTION | INDEPENDENT SEARCH |
| 1 | 4 | EXIT (BUCHEON DIRECTION) | INDEPENDENT SEARCH |
| 1 | 5 | EXIT (GYEYANG DIRECTION) | INDEPENDENT SEARCH |

FIG. 48

| ID | NAME | TYPE | DP |
|---|---|---|---|
| 1 | HOBEOP INTERSECTION | INTERSECTION | Y |
| 2 | HOBEOP INTERSECTION DAEJEON DIRECTION | ENTRANCE | N |
| 3 | HOBEOP INTERSECTION DONG SEOUL DIRECTION | ENTRANCE | N |
| 4 | HOBEOP INTERSECTION WONJU DIRECTION | ENTRANCE | N |
| 5 | HOBEOP INTERSECTION INCHEON DIRECTION | ENTRANCE | N |

FIG. 49

| PID | CID | TREE NAME | SEARCH FLAG |
|---|---|---|---|
| 1 | 2 | DAEJEON DIRECTION | INDEPENDENT SEARCH |
| 1 | 3 | DONG SEOUL DIRECTION | INDEPENDENT SEARCH |
| 1 | 4 | WONJU DIRECTION | INDEPENDENT SEARCH |
| 1 | 5 | INCHEON DIRECTION | INDEPENDENT SEARCH |

FIG. 51

| ID | NAME | TYPE | DP |
|---|---|---|---|
| 1 | OLYMPIC PARK | PARK | Y |
| 3 | OLYMPIC PARK CYCLODROME | CYCLODROME | Y |
| 4 | MONGCHONTOSUNG | ATTRACTION SITE | Y |
| 5 | OLYMPIC PARK SOUTH GATE 2 | ENTRANCE | N |
| 6 | OLYMPIC PARK NORTH GATE 2 | ENTRANCE | N |
| 7 | OLYMPIC HALL | CULTURE HALL | Y |
| 8 | FOREIGN EXCHANGE BANK OLYMPIC BRANCH | BANK | Y |
| 9 | OLYMPIC HALL ENTRANCE | ENTRANCE | N |
| 10 | OLYMPIC HALL PARKING LOT | PARKING LOT | Y |
| 11 | OLYMPIC PARKTEL | HOTEL | Y |
| 12 | OLYMPIC PARKTEL PARKING LOT ENTRANCE | PARKING LOT | N |

FIG. 52

| PID | CID | TREE NAME | SEARCH FLAG |
|---|---|---|---|
| 1 | 3 | CYCLODROME | ONLY SEARCH |
| 1 | 4 | MONGCHONTOSUNG | ONLY SEARCH |
| 1 | 5 | SOUTH GATE 2 | INDEPENDENT SEARCH |
| 1 | 6 | NORTH GATE 2 | INDEPENDENT SEARCH |
| 1 | 7 | OLYMPIC HALL | INDEPENDENT SEARCH |
| 7 | 8 | FOREIGN EXCHANGE BANK | INDEPENDENT SEARCH |
| 7 | 9 | ENTRANCE | INDEPENDENT SEARCH |
| 7 | 10 | PARKING LOT | INDEPENDENT SEARCH |
| 1 | 11 | OLYMPIC PARKTEL | INDEPENDENT SEARCH |
| 11 | 12 | PARKING LOT | INDEPENDENT SEARCH |

METHOD FOR SEARCHING DESTINATION OF TREE STRUCTURE AND SYSTEM THEREOF

This application is the U.S. national phase of International Application No. PCT/KR2007/006856, filed 27 Dec. 2007, which designated the U.S. and claims priority to Korean Application No. 10-2007-0022566, filed 7 Mar. 2007, the entire contents of each of which are hereby incorporated by reference.

TECHNICAL FIELD

The present invention relates to a name retrieving method and system using a tree structure, and more particularly, to a name retrieving method and system that can define a relation between point of interest (POIs) as a POI relation when retrieving a name and thereby can provide a search result in a tree structure.

BACKGROUND ART

Generally, a large facility such as an apartment, a department store, a market, a school, a park, and the like has a plurality of entrances. Accordingly, the route to each entrance may be different.

FIG. 1 illustrates an example of apartment map data 100 according to a conventional art.

Referring to FIG. 1, the apartment map data 100 indicates an example of map data associated with JINJOO apartment. Points of interest (POIs) 101, 102, 103, and 104 indicate JINJOO APT ENTRANCE. A POI 105 indicates JINJOO APT ENTRANCE.

As described above, since the conventional name retrieving method simply performs searching using only an apartment name, it is difficult to retrieve entrance information of a corresponding apartment. FIG. 3 illustrates another example of a search result according to the apartment name of the apartment map data 100 shown in FIG. 1.

FIG. 2 illustrates an example of a search result according to an apartment name of the apartment map data 100 shown in FIG. 1.

Referring to FIG. 2, a view 200 indicates an example of a search result screen when the apartment name is JINJOO APT. The view 200 displays only a name search result associated with JINJOO APT.

As described above, since the conventional destination retrieving method simply performs searching using only an apartment name, it is difficult to retrieve entrance information of a corresponding apartment.

FIG. 3 illustrates another example of a search result according to the apartment name of the apartment map data 100 shown in FIG. 1.

Referring to FIG. 3, a view 300 indicates another example of a search result screen when the apartment name is JINJOO APT. Entrance search results 301 and 302 indicate entrance information associated with JINJOO APT.

However, according to the conventional name retrieving method, when performing searching using an apartment name, a user may not identify a specific entrance based on the entrance search result associated with JINJOO APT as shown in FIG. 3.

FIG. 4 illustrates another example of apartment map data 400 according to the conventional art.

Referring to FIG. 4, the apartment map data 400 indicates an example of map data associated with DAESANG TOWN HYUNDAI APT. A POI 410 indicates a representative location of DAESANG TOWN HYUNDAI APT. POIs 411, 412, and 413 indicate entrance locations of DAESANG TOWN HYUNDAI APT.

FIG. 5 illustrates an example of a search result according to an apartment name of the apartment map data 400 shown in FIG. 4.

Referring to FIG. 5, a view 500 indicates an example of a search result screen when the apartment name is DAESANG TOWN HYUNDAI APT. As described above, according to the conventional destination retrieving method, when performing searching using a long apartment name as shown in FIG. 5, it is difficult to classify the apartment name and apartment entrance POIs.

FIG. 6 illustrates an example of a search result and map data according to a conventional tourist place name search.

Referring to FIG. 6, a view 610 indicates a name search result when a tourist place name is NAMISUM. A menu selection 611 indicates a view location menu and a menu selection 612 indicates a go search menu. Another view 620 indicates map data when the view location menu selection or the go search menu selection of NAMISUM according to the name search is selected. An arrow indicator 621 indicates when a wrong place is retrieved by mis-retrieving NAMISUM according to the selection of the view location menu selection. Another arrow indicator 622 indicates when a nearest road to NAMISUM is retrieved according to the selection of the go search menu selection.

As described above, according to the conventional name retrieving method, a user may be guided to a place different from the user's desired location depending on the view location menu selection or the search menu selection.

FIG. 7 illustrates an example of map data 700 when a highway interchange (IC) has one exit according to the conventional art.

Referring to FIG. 7, the map data 700 indicates an example of a map data displaying screen when the highway IC has a single exit. A POI 710 indicates a location near a tollgate after exiting the highway.

As described above, according to the conventional name retrieving method, when the highway IC has a single exit, a user may use map data as shown in FIG. 7. Accordingly, the user should make a detour to set a route and a display point (DP) may be concentrated on the exit. Here, the DP indicates a point of a name displayed on a screen.

FIG. 8 illustrates an example of map data 800 when a highway IC has two exits according to the conventional art.

Referring to FIG. 8, the map data 800 indicates an example of a map data displaying screen when the highway IC has two exits. A POI 810 indicates a POI location on the center of the highway.

As described above, according to the conventional name retrieving method, when the highway IC has two exits, the user may use map data as shown in FIG. 8. Accordingly, the user should make detour to retrieve the destination and the route.

FIG. 9 illustrates an example of map data 900 in a highway intersection according to the conventional art.

Referring to FIG. 9, the map data 900 indicates an example of a map data displaying screen when a POI location of the highway intersection is located on the intersecting center of the highway. A POI 910 indicates when the POI of the highway intersection is located on the intersecting center of the highway.

As described above, according to the conventional name retrieving method, when a POI is located on the central intersection as shown in FIG. 9, problems may occur in setting a destination and a route.

Also, according to the conventional name retrieving method, when a large number of search results are retrieved, it is difficult to determine which is a user's desired POI.

Also, according to the conventional name retrieving method, it is difficult to know what kinds of POIs exist in the facility. For example, the conventional destination retrieving method may not display a POI such as MONGCHONTO-SUNG located in Olympic park.

Also, according to the conventional name retrieving method, when different names are used for the same facility, for example, BANGI elementary school and BANGI school, they may be recognized as different facilities.

DISCLOSURE OF INVENTION

Technical Goals

An aspect of the present invention provides a name retrieving method and system that can define a relation between points of interest (POIs) as a POI relation when retrieving a name and thereby can provide a search result in a tree structure.

Another aspect of the present invention also provides a name retrieving method and system that can define a relation between an apartment POI and an apartment entrance POI when retrieving an apartment name and provide a search result to thereby enable a user to readily identify an apartment location and an apartment entrance location.

Another aspect of the present invention also provides a name retrieving method and system that can define a relation between POIs and provide a search result in the tree structure in order to prevent the search result from being incompletely displayed when a name is long.

Another aspect of the present invention also provides a name retrieving method and system that can classify at least two equivalent names for each type and thereby provide a name search result when the at least two equivalent names are retrieved as the search result.

Another aspect of the present invention also provides a name retrieving method and system that can define a relation between POIs located in a facility and thereby can provide a search result in the tree structure when retrieving a name.

Another aspect of the present invention also provides a name retrieving method and system that can prevent the same facility from being recognized as a different facility.

Technical Solutions

According to an aspect of the present invention, there is provided a name retrieving method using a tree structure, the method including: analyzing map data to define a relation between points of interest (POIs) as a POI relation; and providing a search result in the tree structure based on the POI relation when retrieving a name.

According to another aspect of the present invention, there is provided a name retrieving system, including: a POI relation defining unit to analyze map data and define a relation between POIs as a POI relation; and a search result providing unit to provide a search result in the tree structure based on the POI relation when retrieving a name.

BRIEF DESCRIPTION OF DRAWINGS

FIG. 12 illustrates an example of a POI table corresponding to the apartment map data shown in FIG. 11;

FIG. 13 illustrates an example of a POI relation table based on the POI table shown in FIG. 12;

FIG. 16 illustrates an example of a POI table corresponding to the apartment map data shown in FIG. 15;

FIG. 17 illustrates an example of a POI relation table based on the POI table shown in FIG. 16;

FIG. 20 illustrates an example of a POI table corresponding to the apartment map data shown in FIG. 19;

FIG. 21 illustrates an example of a POI relation table based on the POI table shown in FIG. 20;

FIG. 25 illustrates an example of a POI table corresponding to the department store map data shown in FIG. 24;

FIG. 26 illustrates an example of a POI relation table based on the POI table shown in FIG. 25;

FIG. 29 illustrates an example of a POI table corresponding to the school map data shown in FIG. 28;

FIG. 30 illustrates an example of a POI relation table based on the POI table shown in FIG. 29;

FIG. 33 illustrates an example of a POI table corresponding to the school map data shown in FIG. 32;

FIG. 34 illustrates an example of a POI relation table based on the POI table shown in FIG. 33;

FIG. 37 illustrates an example of a POI table corresponding to the map data shown in FIG. 36;

FIG. 38 illustrates an example of a POI relation table based on the POI table shown in FIG. 37;

FIG. 40 illustrates an example of a POI table corresponding to the highway IC map data shown in FIG. 39;

FIG. 41 illustrates an example of a POI relation table based on the POI table shown in FIG. 40;

FIG. 44 illustrates an example of a POI table corresponding to the highway IC map data shown in FIG. 43;

FIG. 45 illustrates an example of a POI relation table based on the POI table shown in FIG. 44;

FIG. 48 illustrates an example of a POI table corresponding to the highway intersection map data shown in FIG. 47;

FIG. 49 illustrates an example of a POI relation table based on the POI table shown in FIG. 48;

FIG. 51 illustrates an example of a POI table corresponding to Olympic park map data according to an embodiment of the present invention;

FIG. 52 illustrates an example of a POI relation table based on the POI table shown in FIG. 51;

BEST MODE FOR CARRYING OUT THE INVENTION

Figure 1:
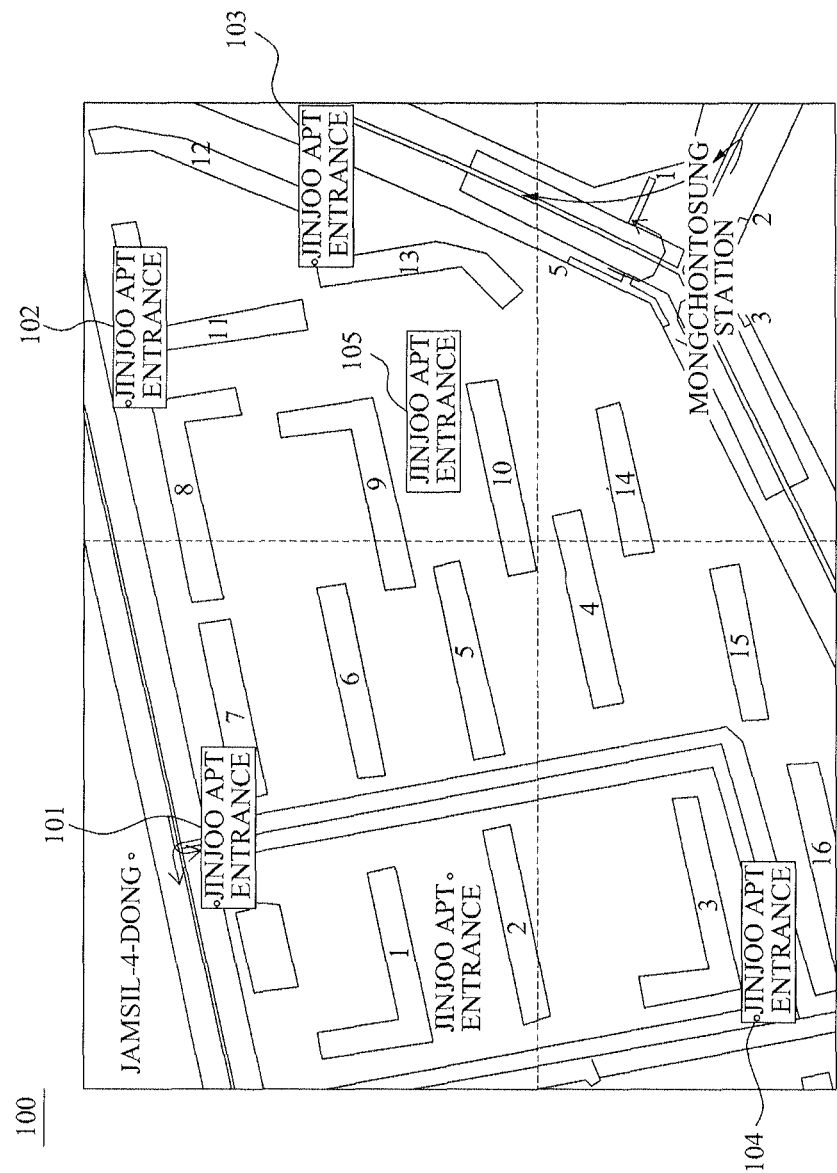
FIG. 1 illustrates an example of apartment map data according to a conventional art.
Figure 2:
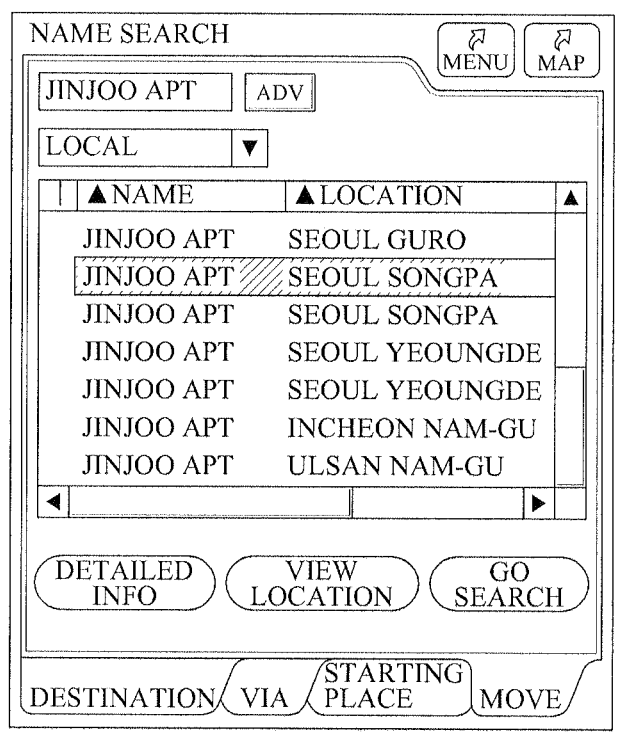
FIG. 2 illustrates an example of a search result according to an apartment name of apartment map data shown in FIG. 1.
Figure 3:
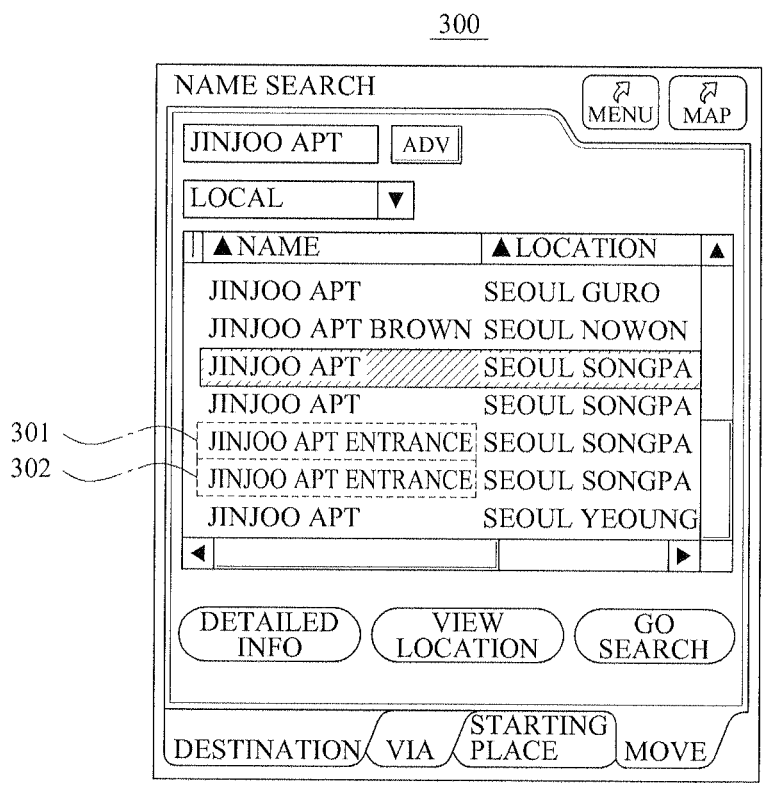
FIG. 3 illustrates another example of a search result according to the apartment name of apartment map data shown in FIG. 1.
Figure 4:
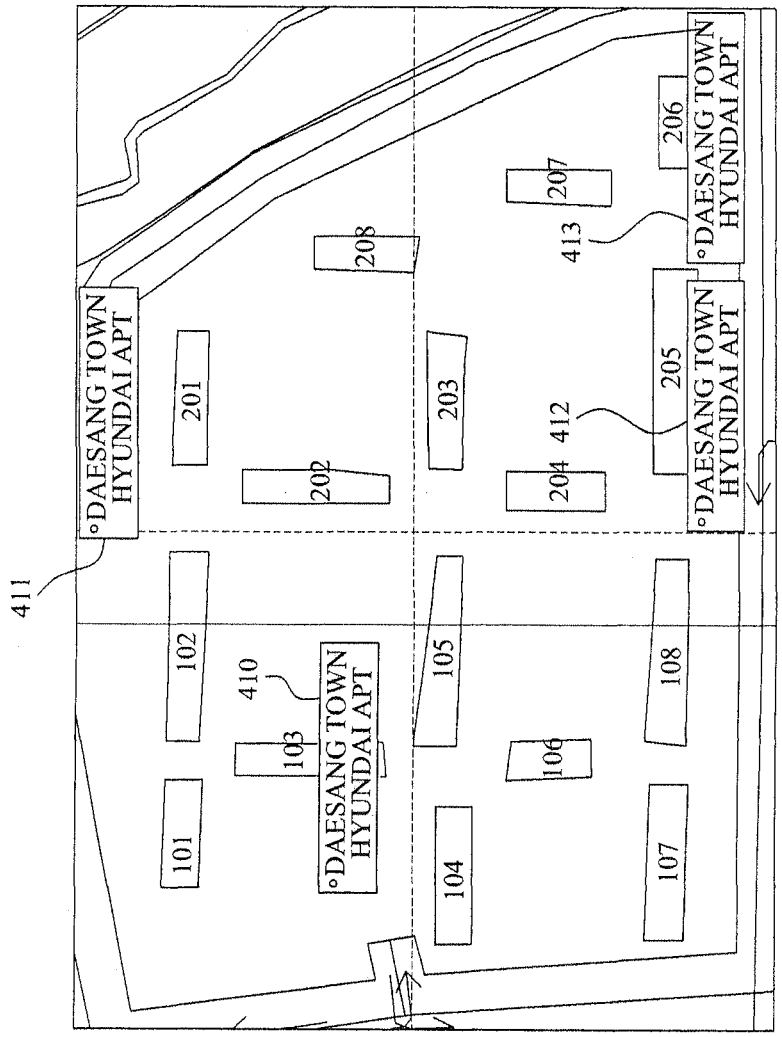
FIG. 4 illustrates another example of apartment map data according to the conventional art.
Figure 5:
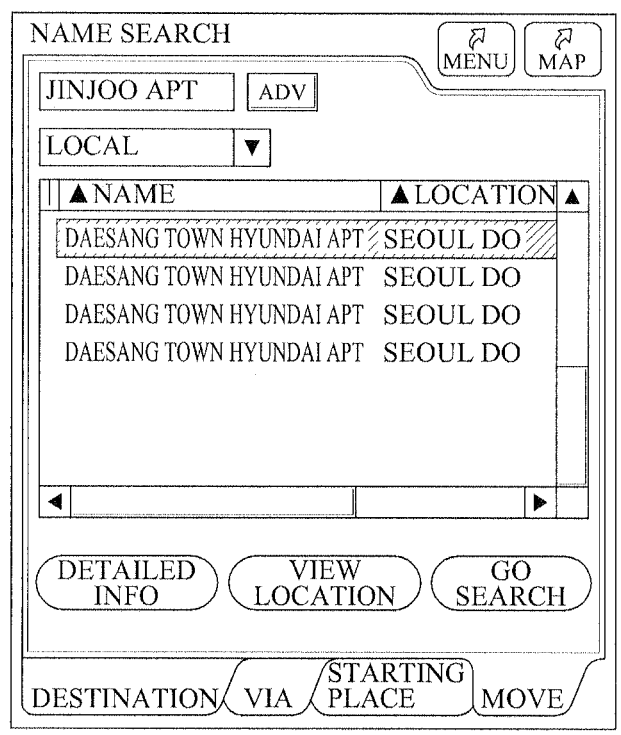
FIG. 5 illustrates an example of a search result according to an apartment name of apartment map data shown in FIG. 4.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 10:
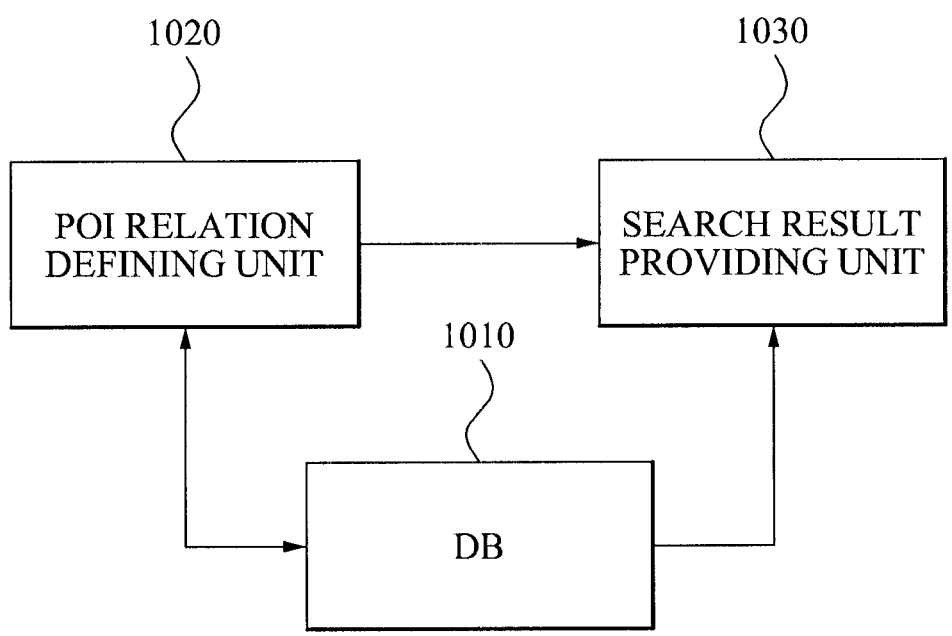
FIG. 10 is a block diagram illustrating a configuration of a destination retrieving system using a tree structure according to an embodiment of the present invention.

FIG. 10 is a block diagram illustrating a configuration of a name retrieving system 1000 using a tree structure according to an embodiment of the present invention. The name retrieving system 1000 includes a database 1010, a point of interest (POI) relation defining unit 1020, and a search result providing unit 1030.

The database 1010 stores and maintains map data for retrieving a search target and various types of data in the tree structure.

The POI relation defining unit 1020 analyzes the map data to define a relation between POIs as a POI relation. Specifically, the POI relation defining unit 1020 may classify display point (DP) coordinates and guide point (GP) coordinates based on the analysis result and define the POI relation. The DP coordinates indicate a point of a name displayed on a screen and the GP coordinates indicate a point of a destination to be actually retrieved. Also, when a plurality of equivalent names is retrieved in the same region the POI relation defining unit 120 classifies the plurality of equivalent names for each category of information and defines the POI relation.

The search result providing unit 1030 provides a search result in the tree structure according to the POI relation. The search result providing unit 1030 receives a search request for a name from the user. The search result providing unit 1030 receives from the user a selection on regional information in the tree structure based on the name and provides a list associated with the selected regional information in the tree structure. The search result providing unit 1030 sets a search point and a search target location in the selected regional information. The list includes a regional information list associated with the name. When the name is a subway station, the list may be a subway station exit number list.

Figure 11:
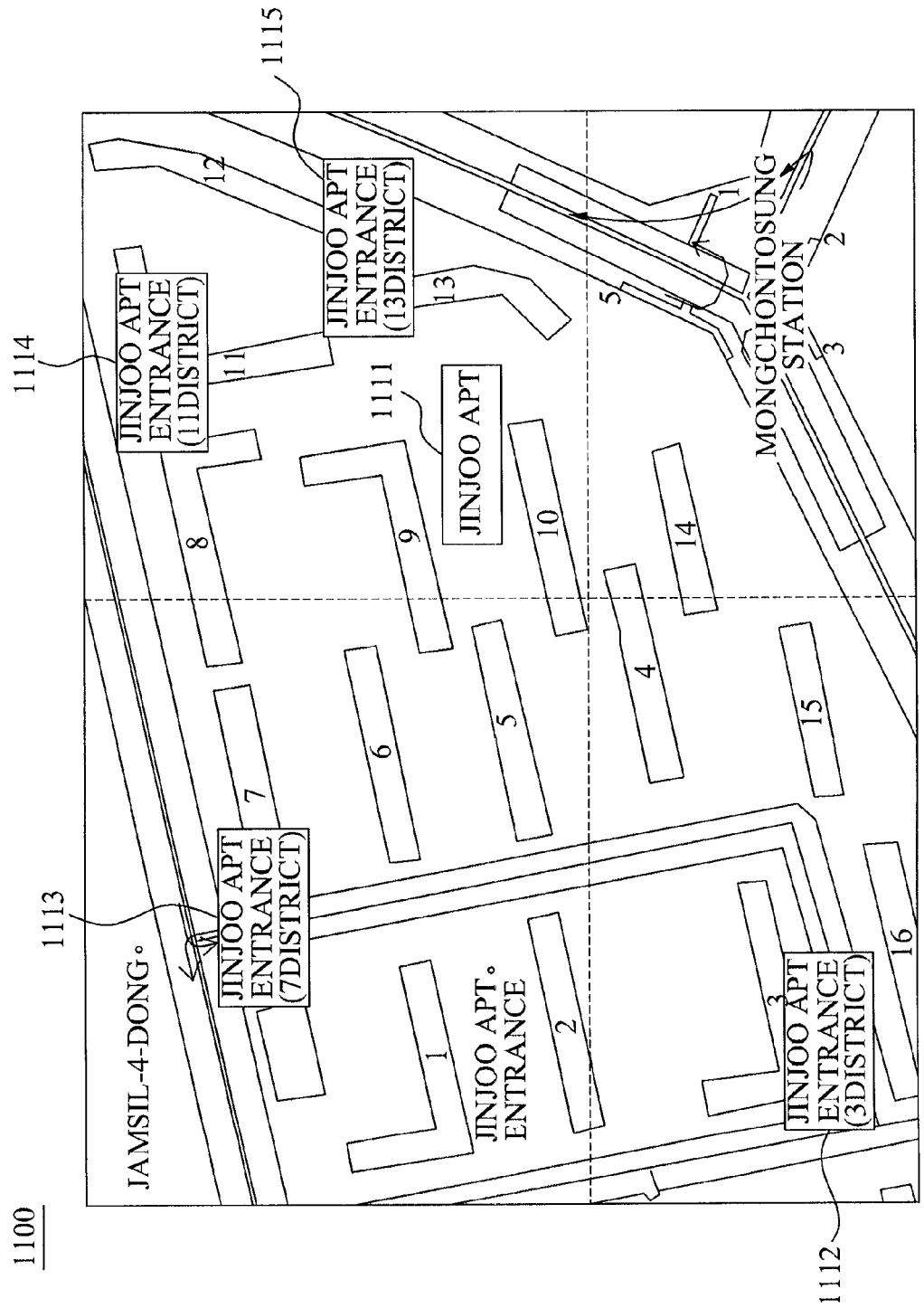
FIG. 11 illustrates an example of apartment map data according to an embodiment of the present invention.

FIG. 11 illustrates an example of apartment map data 1100 according to an embodiment of the present invention.

Referring to FIG. 11, the apartment map data 1100 indicates an example of map data associated with JINJOO APT. A POI 1111 indicates an object POI of JINJOO APT. A POI 1112 indicates the nearest entrance of JINJOO APT 3 DISTRICT. A POI 1113 indicates the nearest entrance of JINJOO APT 7 DISTRICT. A POI 1114 indicates the nearest entrance of JINJOO APT 11 DISTRICT. A POI 1115 indicates the nearest entrance of JINJOO APT 13 DISTRICT.

As described above, according to the present invention, it is possible to classify apartment entrance information for each nearest district to a corresponding entrance and thereby provide a search result. In this aspect, the present invention is different from the conventional map data shown in FIG. 1. Accordingly, a user may readily recognize the user's desired apartment entrance.

FIG. 12 illustrates an example of a POI table corresponding to the apartment map data 1100.

Referring to FIG. 12, the POI table associated with JINJOO APT includes information such as an identification number (ID), a name, a type, and DP. In the case of ID 1, the name is JINJOO APT, the category of information is APARTMENT, and DP information is Y. In the case of ID 2 through ID 5, the name information is JINJOO APT ENTRANCE (3 DISTRICT), JINJOO APT ENTRANCE (7 DISTRICT), JINJOO APT ENTRANCE (11 DISTRICT), AND JINJOO APT ENTRANCE (13 DISTRICT), respectively. The category of information is ENTRANCE and the DP information is N.

FIG. 13 illustrates an example of a POI relation table based on the POI table shown in FIG. 12.

Referring to FIG. 13, the POI relation table associated with JINJOO APT includes information such as a PID, a CID, a tree name, and a search flag. The PID indicates an associated ID in the POI table. The CID indicates a corresponding ID in the POI table. For example, when the tree name is 3 DISTRICT ENTRANCE, JINJOO APT ENTRANCE (3 DISTRICT) is a name associated with JINJOO APT in the POI table shown in FIG. 12. Accordingly, the PID is '1' corresponding to the ID of JINJOO APT. The CID is '2' corresponding to the ID of JINJOO APT ENTRANCE (3 DISTRICT). The search flag information is classified into an independent search or a representative search.

Figure 14:
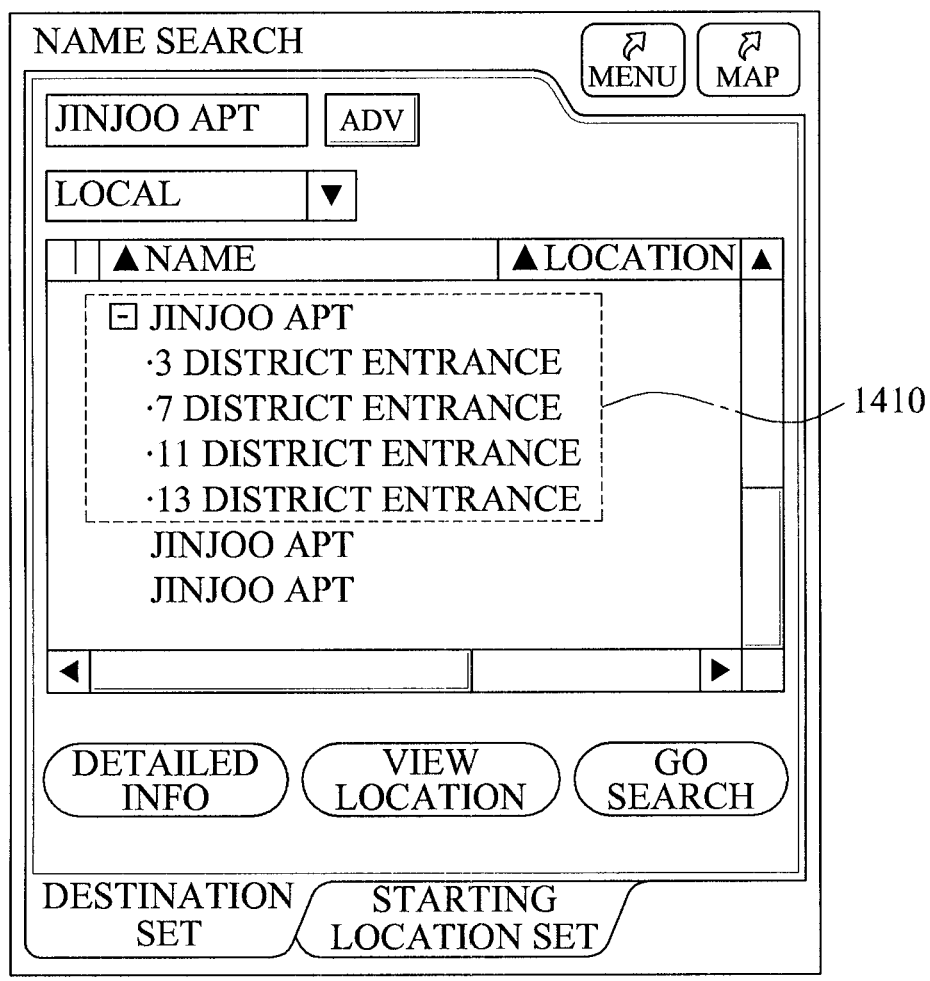
FIG. 14 illustrates an example of a name search result based on the POI relation table shown in FIG. 13.

FIG. 14 illustrates an example of a name search result based on the POI relation table shown in FIG. 13.

Referring to FIG. 14, a view 1400 indicates an example of a name search result screen associated with JINJOO APT. A box 1410 indicates an example of the name search result in the tree structure. In the box 1410, JINJOO APT corresponds to an upper tree structure and entrance information of JIN-JOO APT that is classified for each district corresponds to a lower tree structure.

As described above, according to the represent invention, when there exists a plurality of apartments and entrance information as a search result of an apartment name, the information may be classified using the tree structure to thereby be provided. Accordingly, when retrieving only the apartment name, a user may obtain accurate entrance information.

Figure 15:
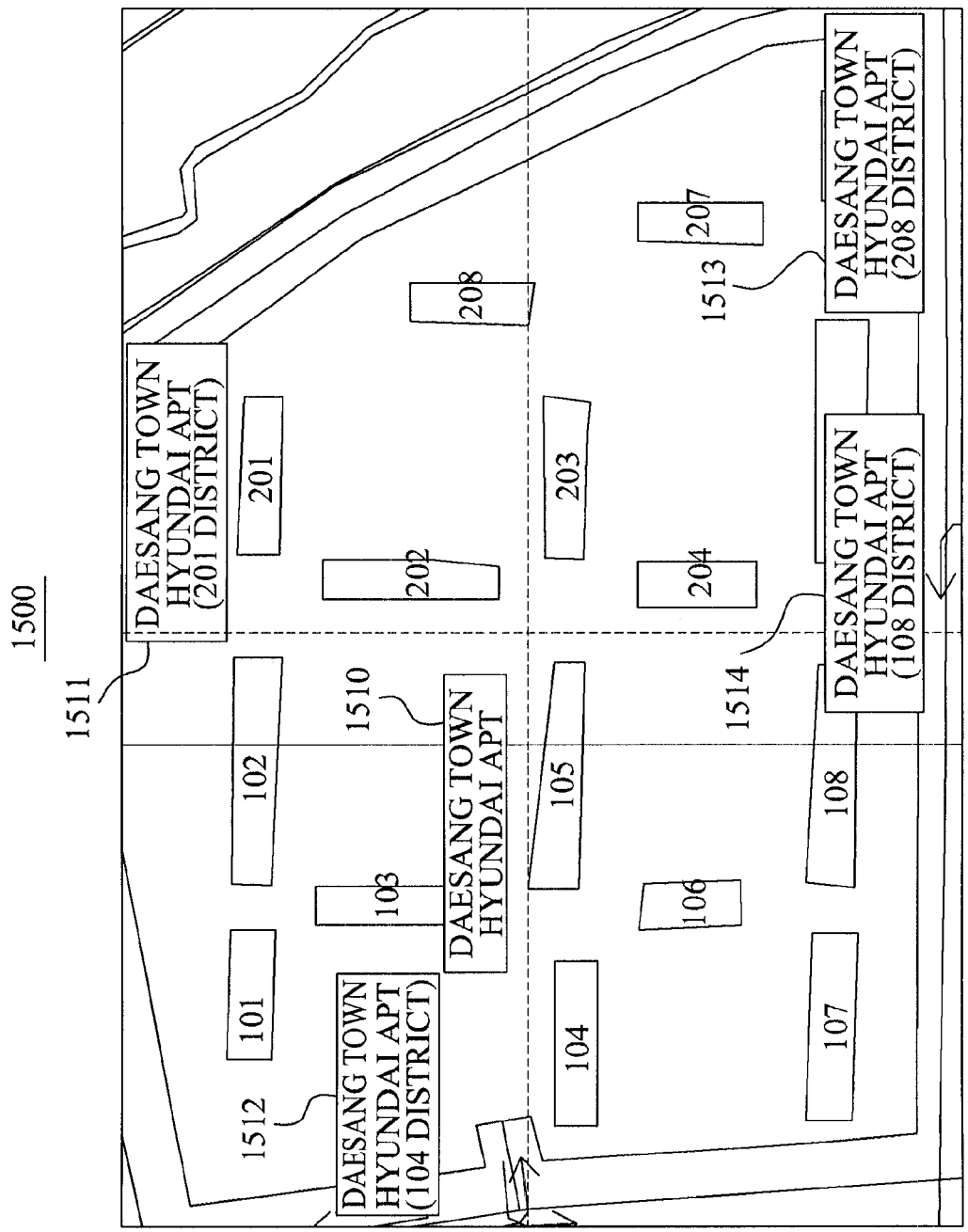
FIG. 15 illustrates another example of apartment map data according to an embodiment of the present invention.

FIG. 15 illustrates another example of apartment map data 1500 according to an embodiment of the present invention.

Referring to FIG. 15, the apartment map data 1500 indicates an example of map data associated with DAESANG TOWN HYUNDAI APT. A POI 1510 indicates an object POI of DAESANG TOWN HYUNDAI APT. A POI 1511 indicates the nearest entrance of DAESANG TOWN HYUNDAI APT 201 DISTRICT. A POI 1512 indicates the nearest entrance of DAESANG TOWN HYUNDAI APT 104 DISTRICT. A POI 1513 indicates the nearest entrance of DAESANG TOWN HYUNDAI APT 208 DISTRICT. A POI 1514 indicates the nearest entrance of DAESANG TOWN HYUNDAI APT 108 DISTRICT.

FIG. 16 illustrates an example of a POI table corresponding to the apartment map data 1500 shown in FIG. 15.

Referring to FIG. 16, the POI table associated with DAESANG TOWN HYUNDAI APT includes information such as an ID, a name, a category, and a DP. In the case of ID1, the name is DAESANG TOWN HYNDAI APT, a information is APARTMENT, and DP information is Y. In the case of ID 2 through ID 5, the name information are DAESANG TOWN HYUNDAI APT ENTRANCE (104 DISTRICT), DAESANG TOWN HYUNDAI APT ENTRANCE (108 DISTRICT), DAESANGE TOWN HYNDAI APT ENTRANCE (201 DISTRICT), and DAESANG TOWN HYUNDAI APT ENTRANCE (208 DISTRICT) respectively. Type information is ENTRANCE and DP information is N.

FIG. 17 illustrates an example of a POI relation table based on the POI table shown in FIG. 16.

Referring to FIG. 17, the POI relation table associated with map data of DAESANG TOWN HYUNDAI APT includes information such as a PID, a CID, a tree name, and a search flag. The PID indicates an associated ID in the POI table. The CID indicates a corresponding ID in the POI table. For example, when the tree name is 104 DISTRICT ENTRANCE, DAESANG TOWN HYUNDAI APT ENTRANCE (104 DISTRICT) is a name associated with DAESANG TOWN HYUNDAI APT in the POI table shown in FIG. 16. Accordingly, the PID is '1' corresponding to the ID of DAESANG TOWN HYUNDAI APT. The CID is '2' corresponding to the ID of DAESANG TOWN HYUNDAI APT ENTRANCE (104 DISTRICT). The search flag information is classified into an independent search or a representative search.

Figure 18:
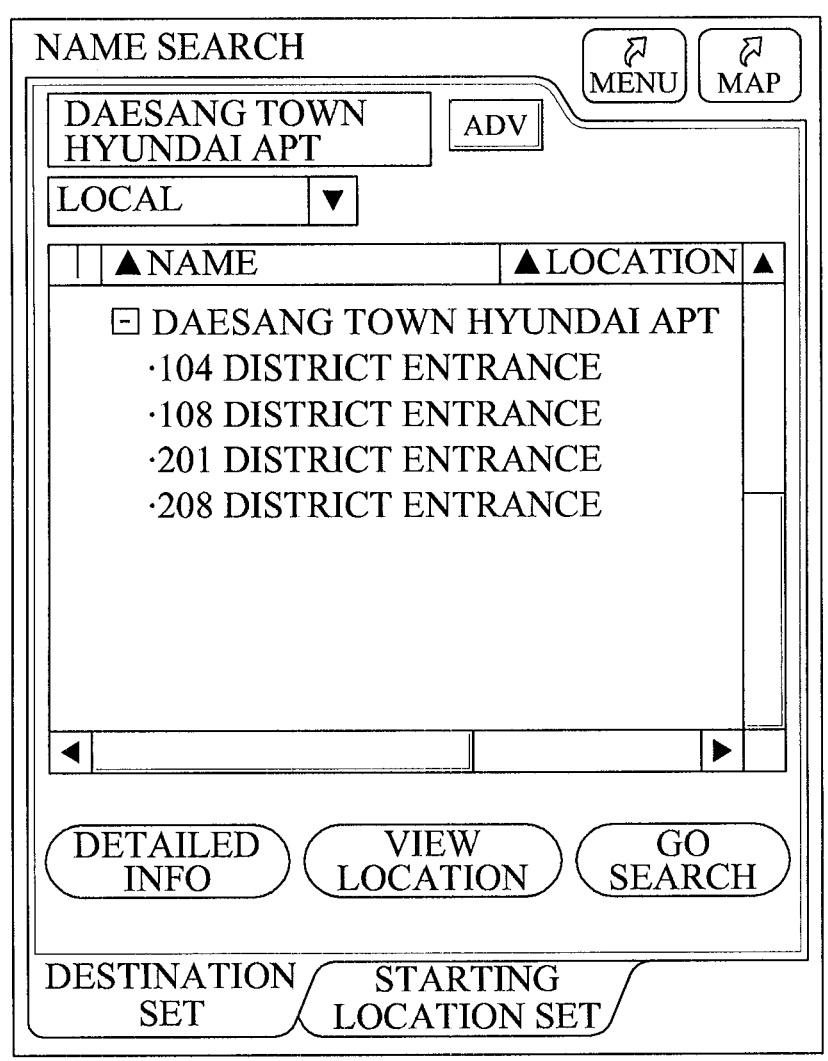
FIG. 18 illustrates an example of a name search result based on the POI relation table shown in FIG. 17.

FIG. 18 illustrates an example of a name search result based on the POI relation table shown in FIG. 17.

Referring to FIG. 18, a view 1800 indicates an example of a name search result screen associated with DAESANG TOWN HYUNDAI APT. The tree structure according to the name search result of DAESANG TOWN HYUNDAI APT indicates DAESANG TOWN HYUNDAI APT as the upper tree structure and indicates, as the lower tree structure, DAESANG TOWN HYUNDAI APT ENTRANCE that is classified for each district.

Figure 19:
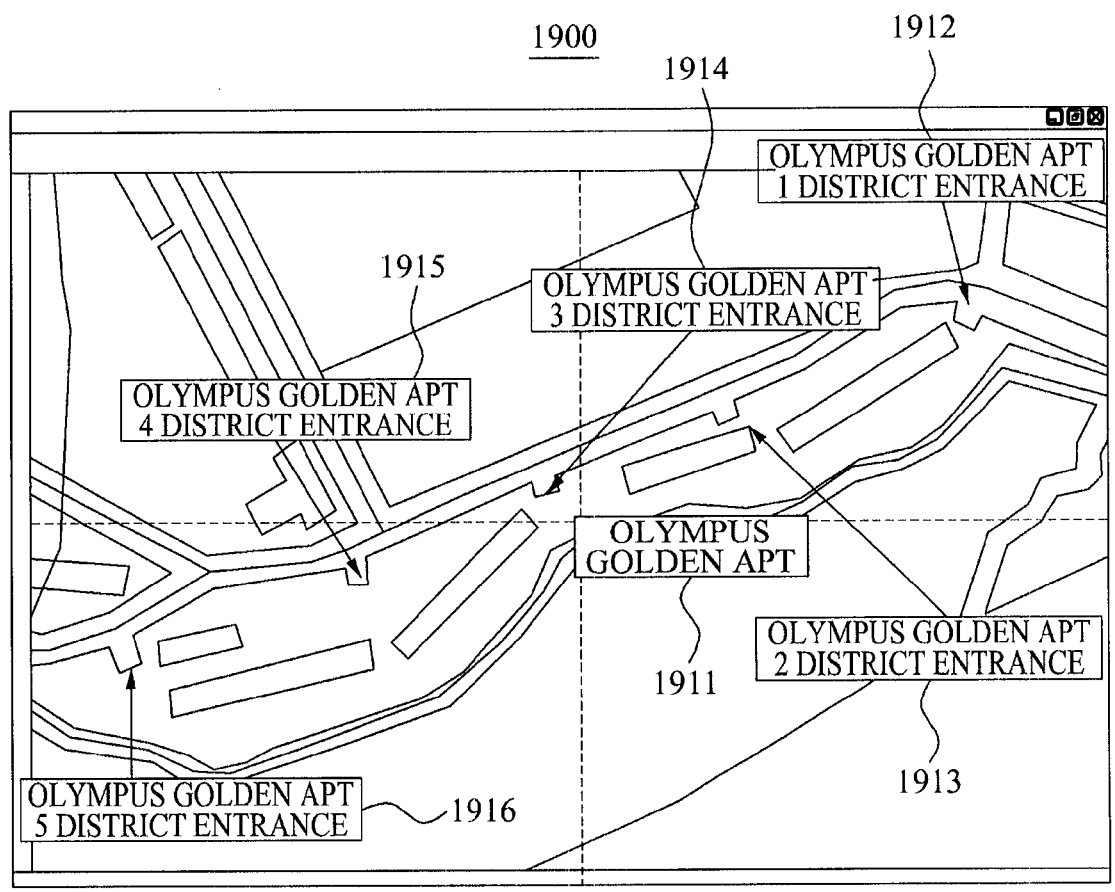
FIG. 19 illustrates still another example of apartment map data according to an embodiment of the present invention.

FIG. 19 illustrates still another example of apartment map data 1900 according to an embodiment of the present invention.

Referring to FIG. 19, the apartment map data 1900 indicates an example of map data associated with OLYMPUS GOLDEN APT. A POI 1911 indicates an object POI of OLYMPUS GOLDEN APT. A POI 1912 indicates an entrance of OLYMPUS GOLDEN APT 1 DISTRICT. A POI 1913 indicates an entrance of OLYMPUS GOLDEN APT 2 DISTRICT. A POI 1914 indicates an entrance of OLYMPUS GOLDEN APT 3 DISTRICT. A POI 1915 indicates an entrance of OLYMPUS GOLDEN APT 4 DISTRICT. A POI 1916 indicates an entrance of OLYMPUS GOLDEN APT 5 DISTRICT.

As described above, according to the present invention, it is possible to classify apartment entrance information for each district in apartment map data. Accordingly, a user may accurately identify both an apartment location and each district entrance location.

FIG. 20 illustrates an example of a POI table corresponding to the apartment map data 1900 shown in FIG. 19.

Referring to FIG. 20, the POI table associated with OLYMPUS GOLDEN APT includes information such as an ID, a name, a type, and a DP. In the case of ID 1, the name is OLYMPUS GOLDEN APT, type information is APARTMENT, and DP information is Y. In the case of ID 2 through ID 5, name information are OLYMPUS GOLDEN APT ENTRANCE (1 DISTRICT), OLYMPUS GOLDEN APT ENTRANCE (2 DISTRICT), OLYMPUS GOLDEN APT ENTRANCE (3 DISTRICT), and OLYMPUS GOLDEN APT ENTRANCE (4 DISTRICT), respectively. Type information is ENTRANCE and the DP information is 'N'.

FIG. 21 illustrates an example of a POI relation table based on the POI table shown in FIG. 20.

Referring to FIG. 21, the POI relation table associated with map data of OLYMPUS GOLDEN APT includes information such as a PID, a CID, a tree name, and a search flag. The PID indicates an associated ID in the POI table. The CID indicates a corresponding ID in the POI table. For example, when the tree name is 1 DISTRICT ENTRANCE, OLYMPUS GOLDEN APT ENTRANCE (1 DISTRICT) is a name associated with OLYMPUS GOLDEN APT in the POI table shown in FIG. 20. Accordingly, the PID is '1' corresponding to the ID of OLYMPUS GOLDEN APT. The CID is '2' corresponding to the ID of OLYMPUS GOLDEN APT ENTRANCE (1 DISTRICT). The search flag information is classified into an independent search or a representative search.

Figure 22:
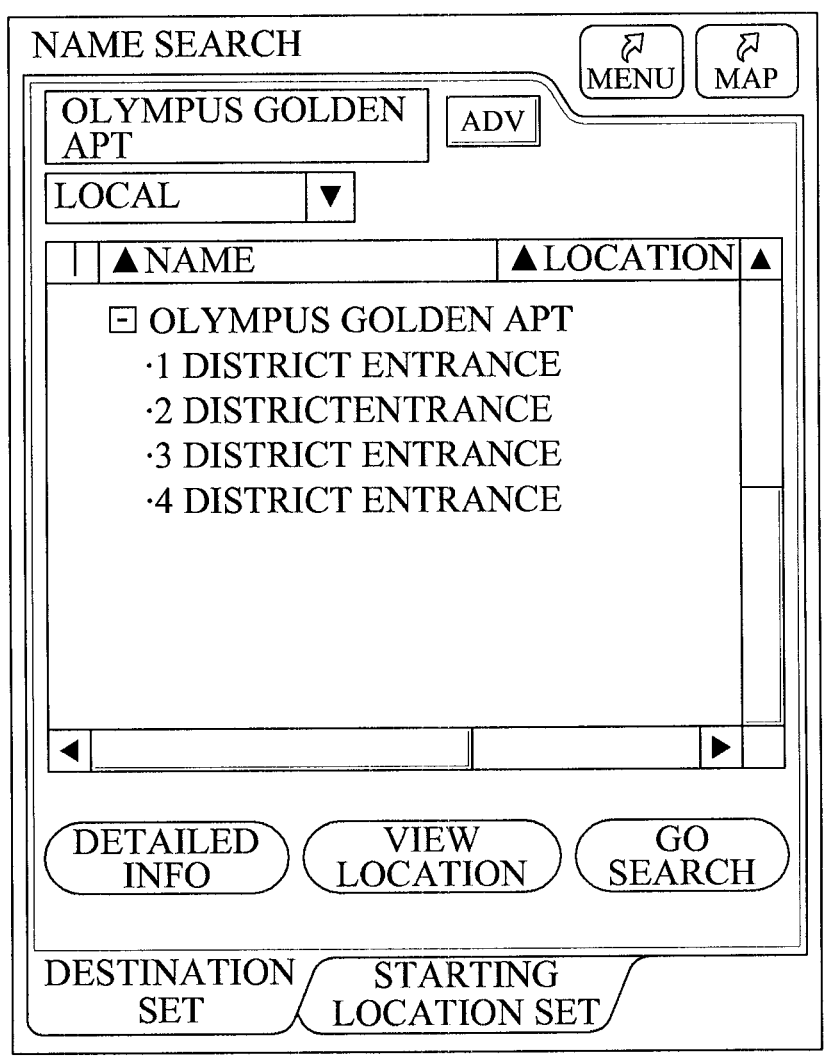
FIG. 22 illustrates an example of a name search result based on the POI relation table shown in FIG. 21.

FIG. 22 illustrates an example of a name search result based on the POI relation table shown in FIG. 21.

Referring to FIG. 22, a view 2200 indicates an example of a name search result screen associated with OLYMPUS GOLDEN APT. The tree structure according to the name search result of OLYMPUS GOLDEN APT indicates OLYMPUS GOLDEN APT as the upper tree structure and indicates, as the lower tree structure, OLYMPUS GOLDEN APT ENTRANCE that is classified for each district.

Figure 23:
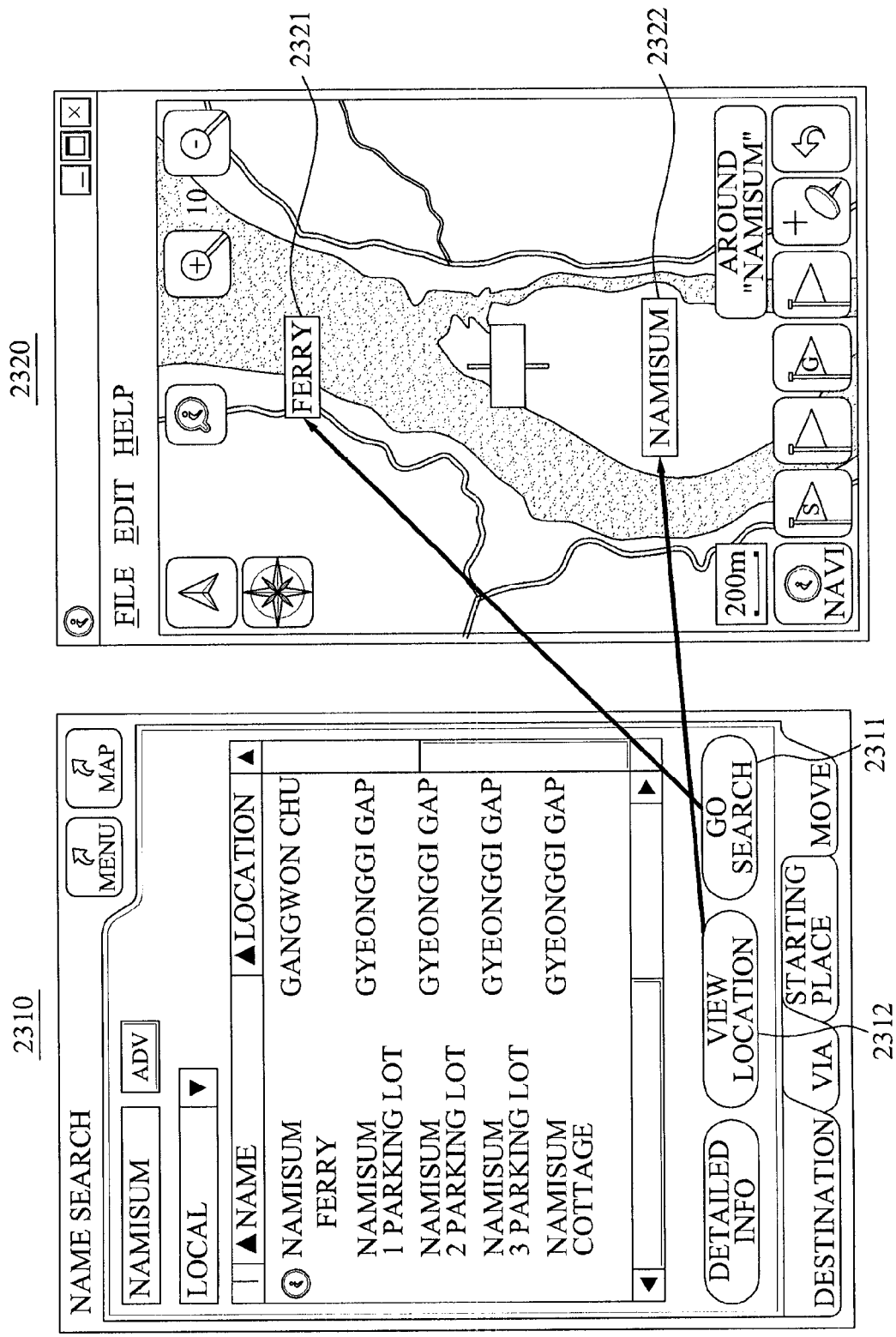
FIG. 23 illustrates an example of a search result and map data of NAMISUM according to an embodiment of the present invention.

As described above, according to the present invention, it is possible to classify apartment map data into an apartment name and an apartment entrance to thereby provide a name search result in the tree structure. Accordingly, a user may readily identify an apartment name POI and an apartment entrance POI. FIG. 23 illustrates an example of a search result and map data of NAMISUM according to an embodiment of the present invention.

Referring to FIG. 23, a view 2310 indicates an example of a name search result associated with NAMISUM. A menu selection 2311 indicates a go search menu. A menu selection 2312 indicates a location view menu. Another view 2320 indicates an example of surrounding map data of NAMISUM. A POI 2321 accurately indicates a ferry terminal location in the surrounding map data when the go search menu selection is selected. A POI 2322 accurately indicates a location of NAMISUM in the surrounding map data when the location view menu selection is selected.

Figure 6:
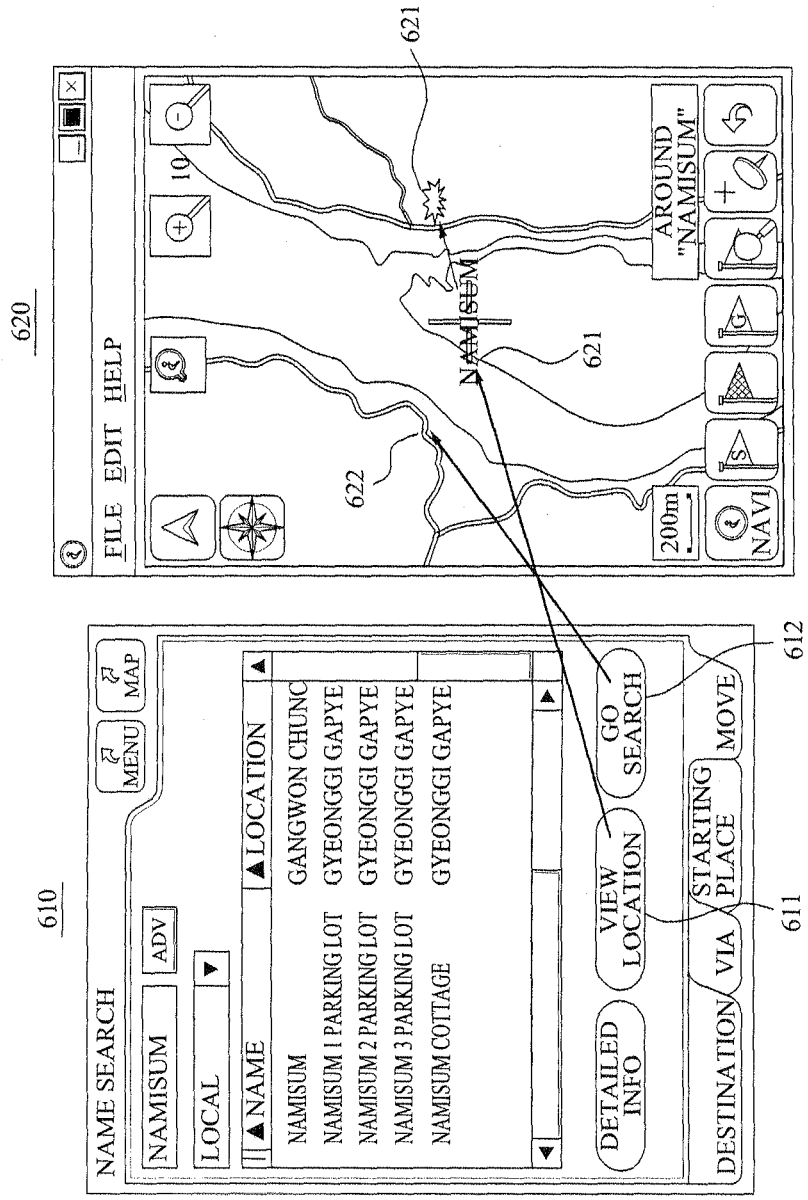
FIG. 6 illustrates an example of a search result and map data according to the conventional tourist place name search.
Figure 7:
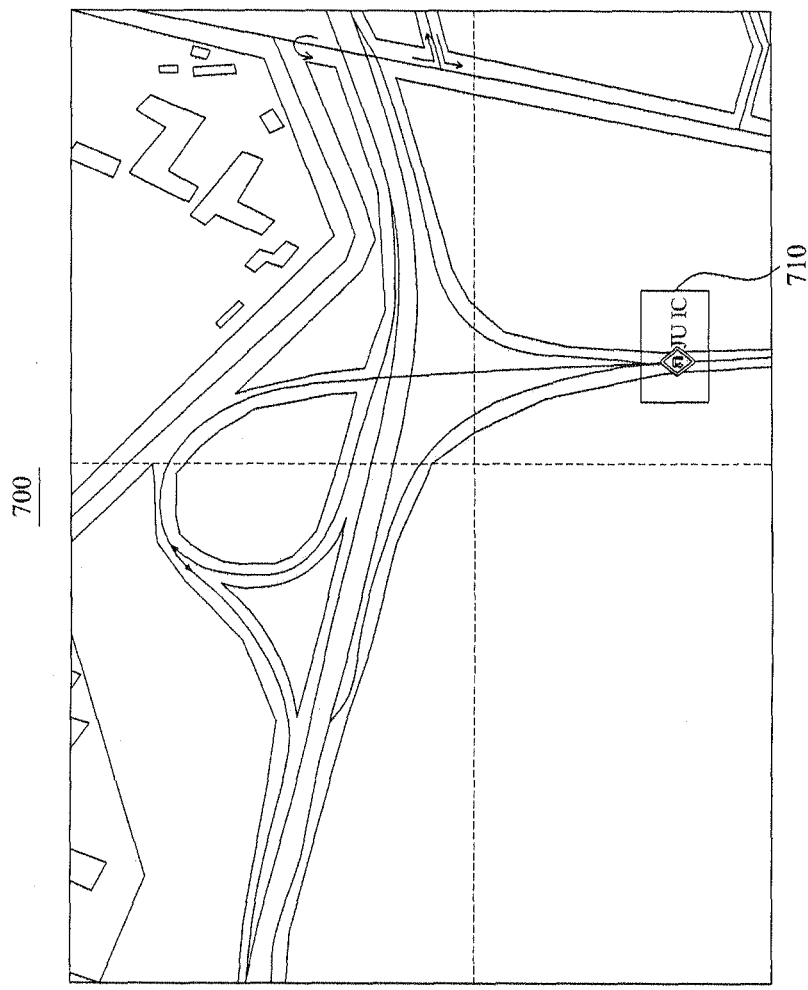
FIG. 7 illustrates an example of map data when a highway interchange (IC) has a single exit according to the conventional art.

As described above, according to the present invention, it is possible to solve the problem in the conventional art of retrieving a place different from a user's desired location according to the location view menu selection or the go search menu selection shown in FIG. 6.

Figure 24:
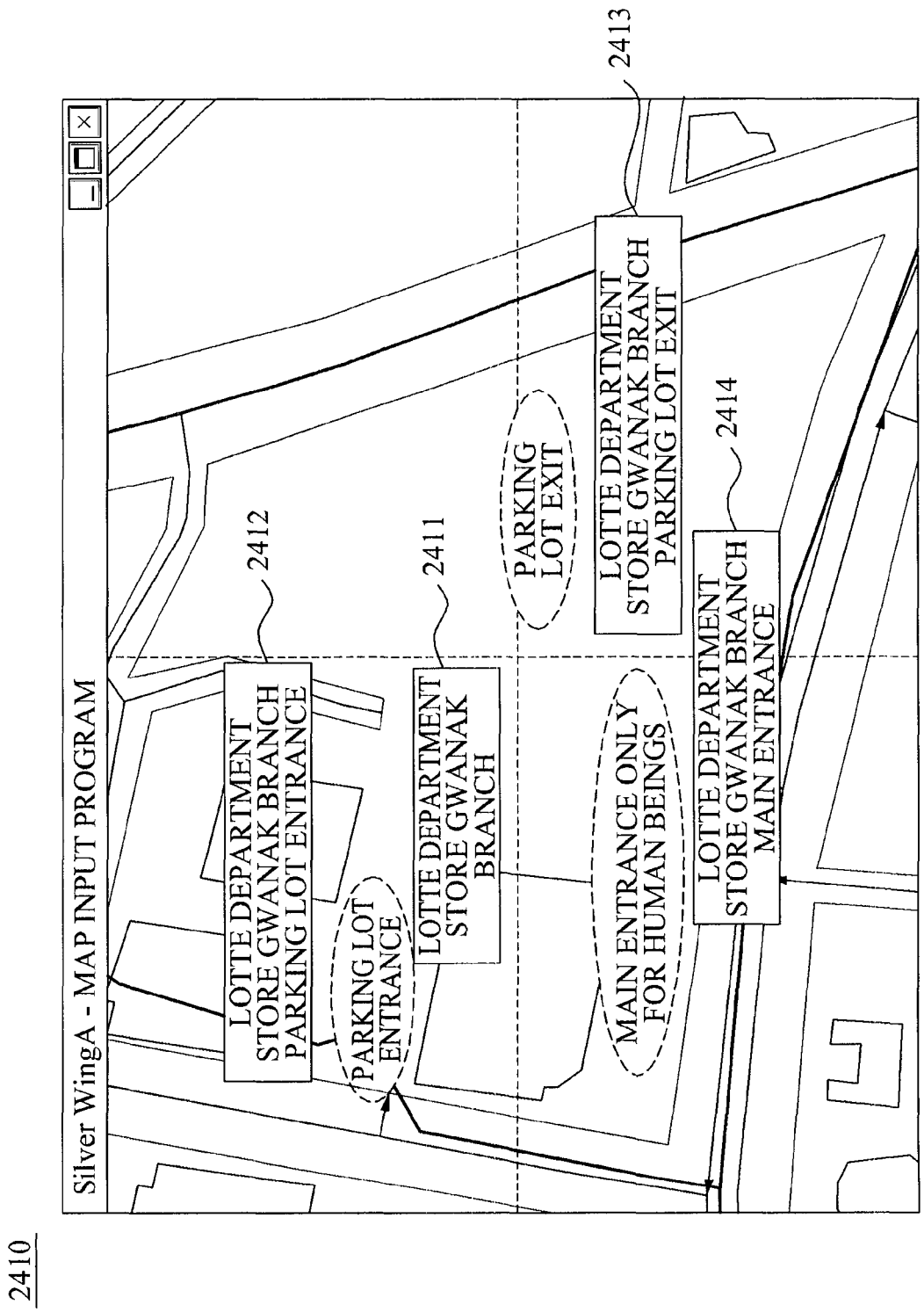
FIG. 24 illustrates an example of department store map data according to an embodiment of the present invention.

FIG. 24 illustrates an example of department store map data 2410 according to an embodiment of the present invention.

Referring to FIG. 24, the department store map data 2410 indicates an example of map data associated with LOTTE DEPARTMENT STORE GWANAK BRANCH. A POI 2411 indicates LOTTE DEPARTMENT STORE GWANAK BRANCH. A POI 2412 indicates LOTTE DEPARTMENT STORE GWANAK BRANCH PARKING LOT ENTRANCE. A POI 2413 indicates LOTTE DEPARTMENT STORE GWANAK BRANCH PARKING LOT EXIT. A POI 2414 indicates LOTTE DEPARTMENT STORE GWANAK BRANCH MAIN ENTRANCE. An entrance type may be classified into an entrance allowing entering and exiting of both human beings and vehicles, an entrance allowing only vehicle entering, an entrance allowing only vehicle exiting, and an entrance allowing entering and exiting of only human beings.

FIG. 25 illustrates an example of a POI table corresponding to the department store map data 2410 shown in FIG. 24. Referring to FIG. 25, the POI table corresponding to map data of LOTTE DEPARTMENT STORE GWANAK BRANCH includes information such as an ID, a name, a type, and a DP. In the case of ID 1, the name is LOTTE DEPARTMENT STORE GWANAK BRANCH, type information is DEPARTMENT STORE, and DP information is Y. In the case of ID 2, the name is LOTTE DEPARTMENT STORE GWANAK BRANCH PARKING LOT ENTRANCE, type information is ENTRANCE, VEHICLE ENTRANCE, and DP information is N. In the case of ID 3, the name is LOTTE DEPARTMENT STORE GWANAK BRANCH PARKING LOT EXIT, type information is ENTRANCE, VEHICLE EXIT, and DP information is N. In the case of ID 4, the name is LOTTE DEPARTMENT STORE GWANAK BRANCH MAIN ENTRANCE, type information is ENTRANCE, HUMAN BEINGS, and DP information is N.

As described above, according to the present invention, it is possible to manage a POI table to make it possible to classify a plurality of entrance information into an entrance allowing entering and exiting of both human beings and vehicles, an entrance allowing only vehicle entering, an entrance allowing only vehicle exiting, and an entrance allowing entering and exiting of only human beings.

FIG. 26 illustrates an example of a POI relation table based on the POI table shown in FIG. 25.

Referring to FIG. 26, the POI relation table associated with map data of LOTTE DEPARTMENT STORE GWANAK BRANCH includes information such as a PID, a CID, a tree name, and a search flag. The PID indicates an associated ID in the POI table. The CID indicates a corresponding ID in the POI table. For example, when the tree name is PARKING LOT ENTRANCE, LOTTE DEPARTMENT STORE GWANAK BRANCH PARKING LOT ENTRANCE is a name associated with LOTTE DEPARTMENT STORE GWANAK BRANCH in the POI table shown in FIG. 25. Accordingly, the PID is '1' corresponding to the ID of LOTTE DEPARTMENT STORE GWANAK BRANCH. The CID is '2' corresponding to the ID of LOTTE DEPARTMENT STORE GWANAK BRANCH PARKING LOT ENTRANCE. The search flag information is classified into an independent search or a representative search.

Figure 27:
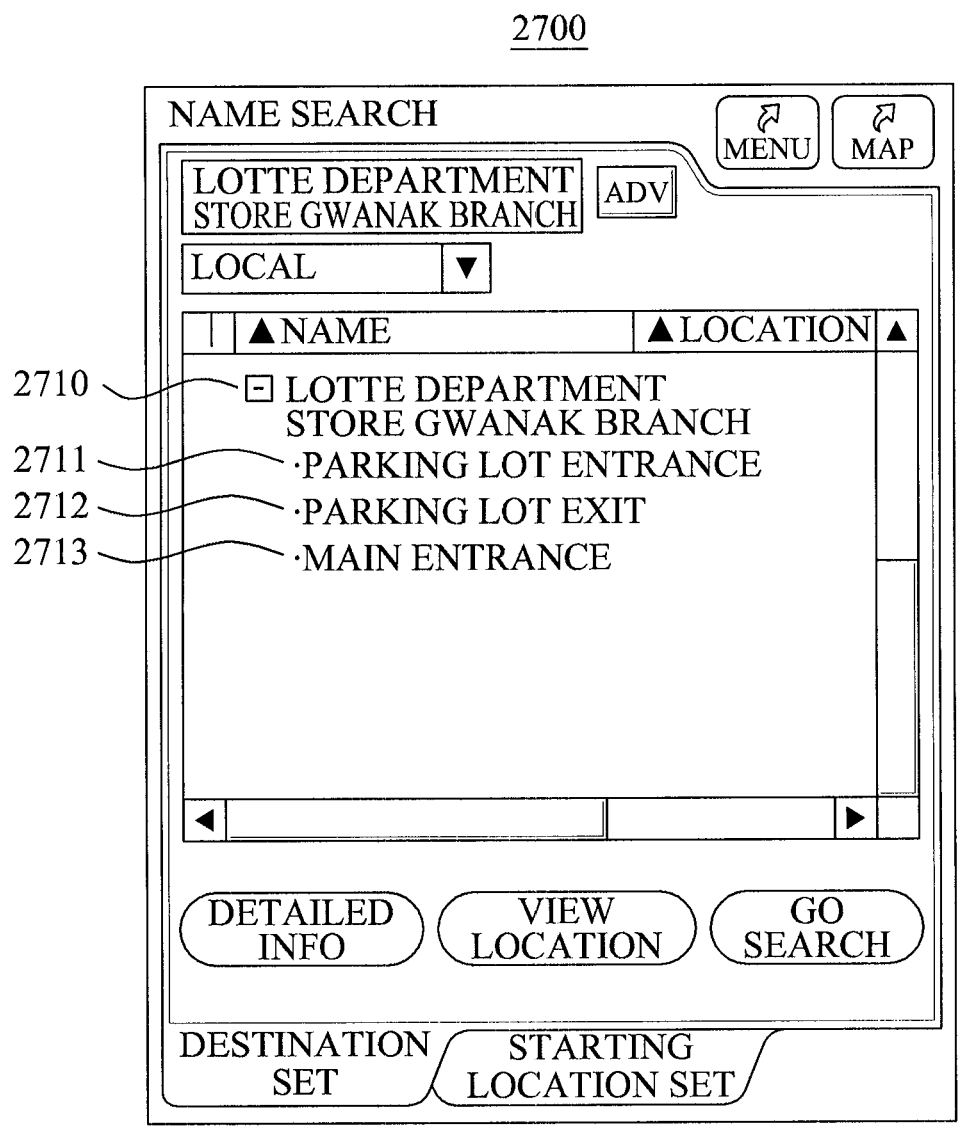
FIG. 27 illustrates an example of a name search result based on the POI relation table shown in FIG. 26.

FIG. 27 illustrates an example of a name search result based on the POI relation table shown in FIG. 26.

Referring to FIG. 27, a view 2700 indicates an example of a name search result screen associated with LOTTE DEPARTMENT STORE GWANAK BRANCH and displays the name search result in the tree structure. LOTTE DEPARTMENT STORE GWANAK BRANCH 2710 corresponds to the upper tree structure, and PARKING LOT ENTRANCE 2711, PARKING LOT EXIT 2712, and MAIN ENTRANCE 2713 correspond to the lower tree structure.

As described above, according to the present invention, when there exists a plurality of entrance information such as parking lot entrance, parking lot exit, main entrance, and the like in a department store or a large shopping mall, it is possible to provide the plurality of entrance information in the tree structure, as the name search result. Accordingly, a user may accurately identify a location of the user's desired building and entrance information thereof.

Figure 28:
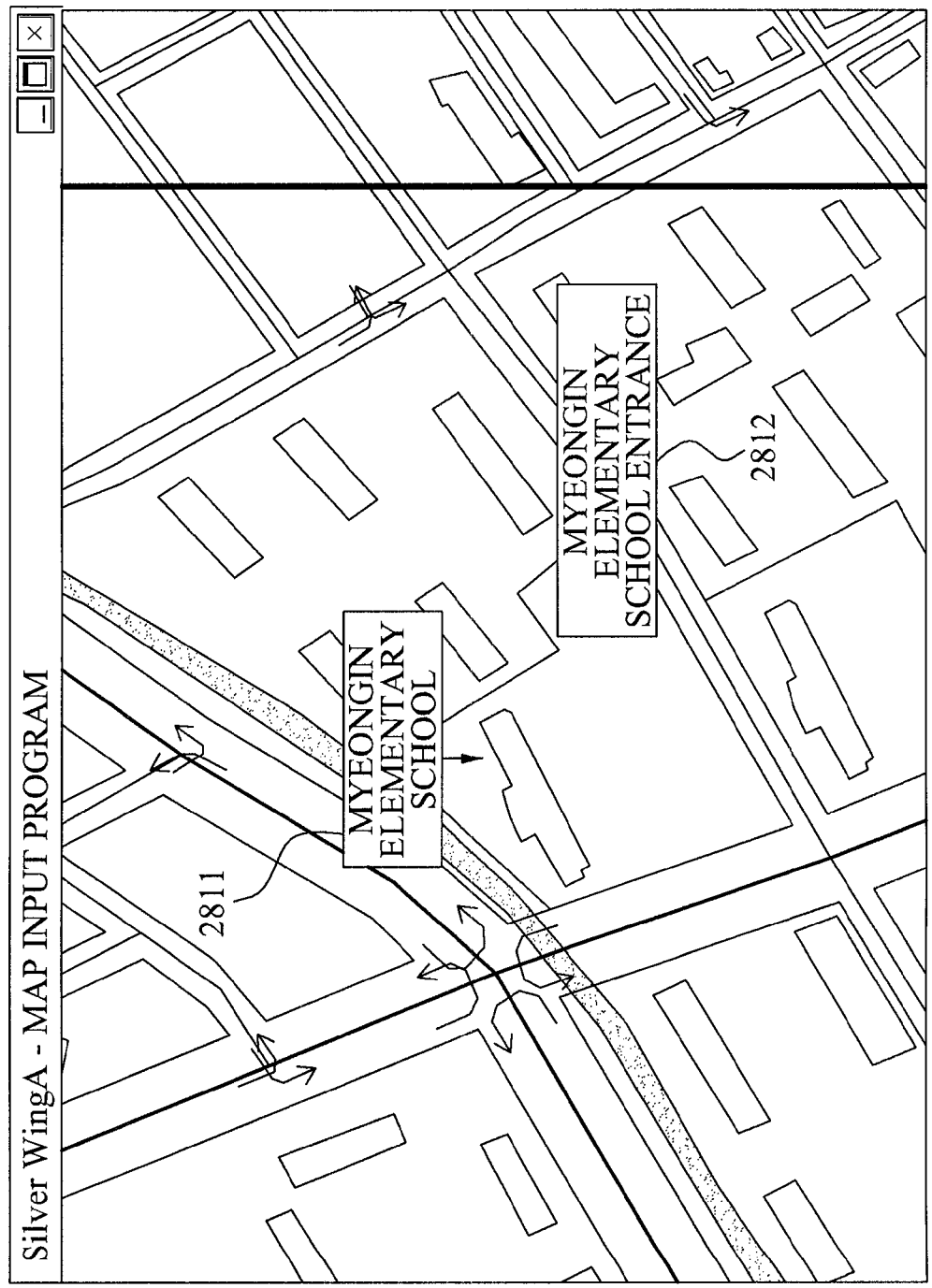
FIG. 28 illustrates an example of school map data according to an embodiment of the present invention.

FIG. 28 illustrates an example of school map data 2810 according to an embodiment of the present invention. Referring to FIG. 28, the school map data 2810 indicates an example of map data associated with MYEONGIN ELEMENTARY SCHOOL that has a single entrance. A POI 2811 indicates a location of MYEONGIN ELEMENTARY SCHOOL. A point 2812 indicates a location of MYEONGIN ELEMENTARY SCHOOL ENTRANCE.

As described above, according to the present invention, it is possible to provide map data that can accurately indicate a representative location of a school and entrance information of the school in school map data with the single entrance.

FIG. 29 illustrates an example of a POI table corresponding to the school map data 2810 shown in FIG. 28.

Referring to FIG. 29, the POI table corresponding to the school map data 2810 includes information such as an ID, a name, a type, and a DP. In the case of ID 1, the name is MYEONGIN ELEMENTARY SCHOOL, type information is ELEMENTARY SCHOOL, and DP information is Y. In the case of ID 2, the name is MYEONGIN ELEMENTARY SCHOOL ENTRANCE, type information is ENTRANCE, and DP information is N.

FIG. 30 illustrates an example of a POI relation table based on the POI table shown in FIG. 29.

Referring to FIG. 30, the POI relation table associated with map data of MYEONGIN ELEMENTARY SCHOOL includes information such as a PID, a CID, a tree name, and a search flag. The PID indicates an associated ID in the POI table. The CID indicates a corresponding ID in the POI table. For example, when the tree name is ENTRANCE, MYEONGIN ELEMENTARY SCHOOL ENTRANCE is a name associated with MYEONGIN ELEMENTARY SCHOOL in the POI table shown in FIG. 25. Accordingly, the PID is '1' corresponding to the ID of MYEONGIN ELEMENTARY SCHOOL. The CID is '2' corresponding to the ID of MYEO- NGIN ELEMENTARY SCHOOL ENTRANCE. The search flag information is a representative search.

Figure 31:
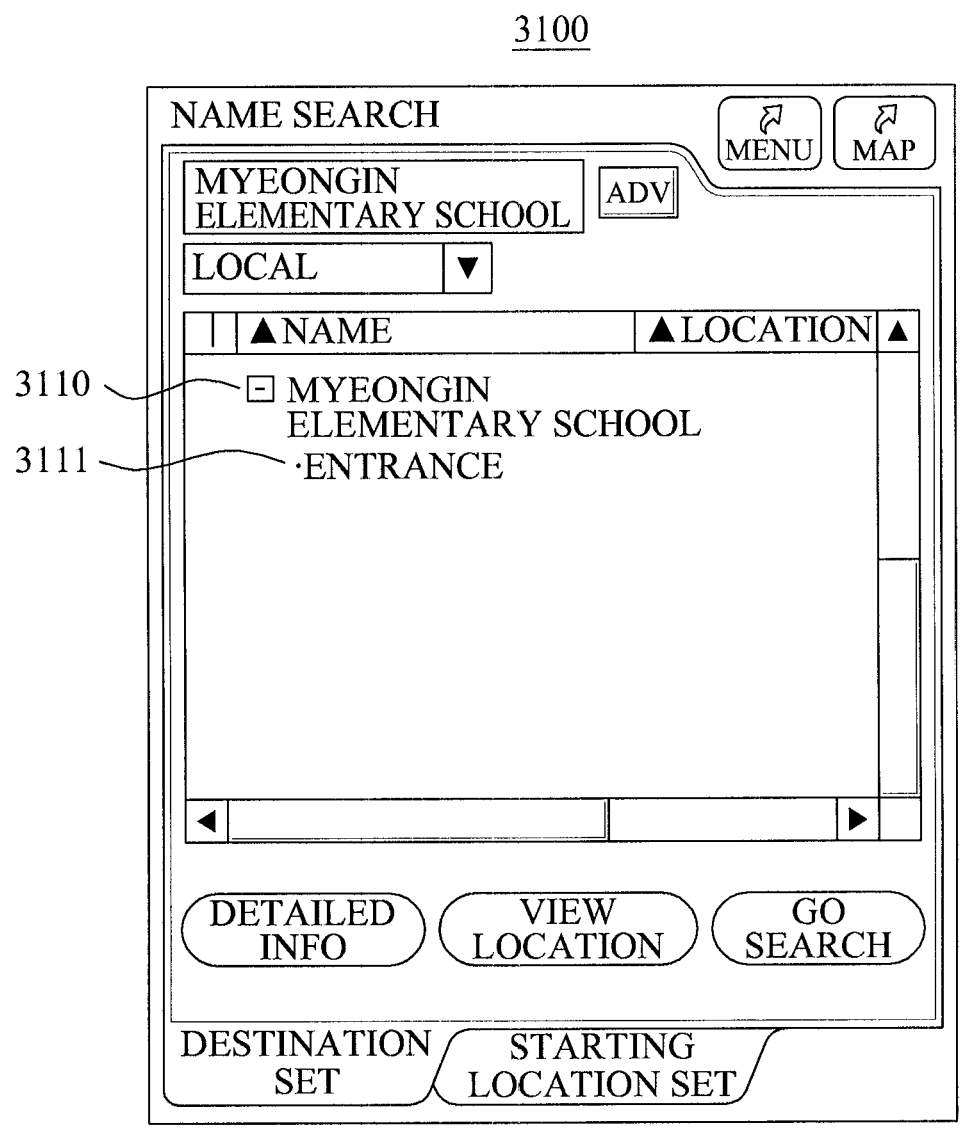
FIG. 31 illustrates an example of a name search result based on the POI relation table shown in FIG. 30.

FIG. 31 illustrates an example of a name search result based on the POI relation table shown in FIG. 30.

Referring to FIG. 31, a view 3100 indicates an example of a name search result screen associated with MYEONGIN ELEMENTARY SCHOOL. MYEONGIN ELEMENTARY SCHOOL 3110 corresponds to the upper tree structure, and ENTRANCE 3111 corresponds to the lower tree structure.

As described above, according to the present invention, it is possible to provide a name search result in the tree structure that can accurately display a school location and school entrance information in school map data with a single entrance.

Figure 32:
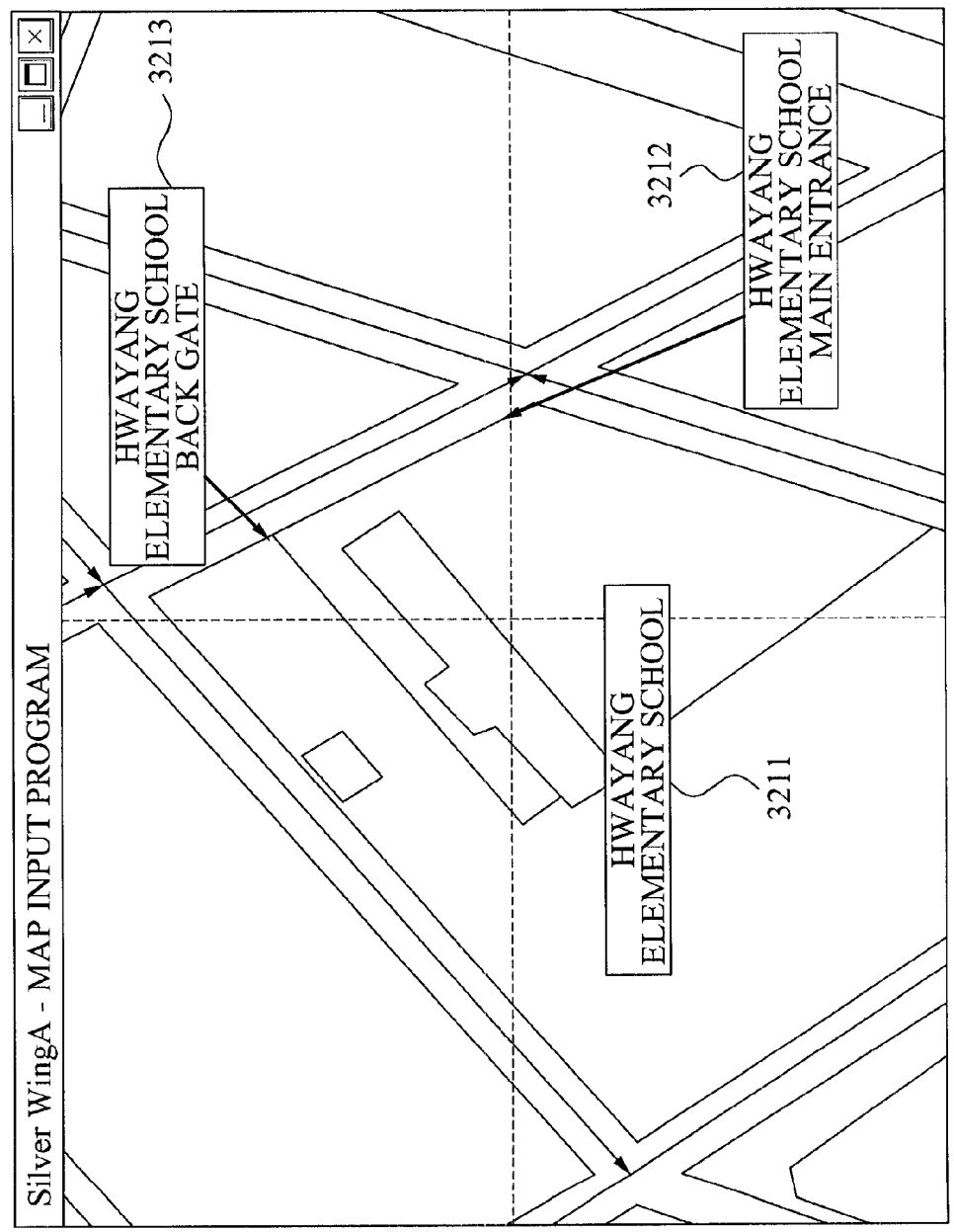
FIG. 32 illustrates another example of school map data according to an embodiment of the present invention.

FIG. 32 illustrates another example of school map data 3200 according to an embodiment of the present invention.

Referring to FIG. 32, the school map data 3200 indicates an example of map data associated with HWAYANG ELEMENTARY SCHOOL that has two entrances. A POI 3211 indicates a representative location of HWAYANG ELEMENTARY SCHOOL. A POI 3212 indicates a location of HWAYANG ELEMENTARY SCHOOL MAN ENTRANCE. A POI 3213 indicates a location of HWAYANG ELEMENTARY SCHOOL BACK GATE.

As described above, according to the present invention, when a school has at least two entrances, it is possible to provide map data by classifying entrance information into main entrance location information and back gate location information. Accordingly, a user may readily identify a main entrance and a back gate of the school.

FIG. 33 illustrates an example of a POI table corresponding to the school map data 3200 shown in FIG. 32.

Referring to FIG. 33, the POI table corresponding to the school map data 3200 includes information such as an ID, a name, a type, and a DP. In the case of ID 1, the name is HWAYANG ELEMENTARY SCHOOL, type information is ELEMENTARY SCHOOL, and DP information is Y. In the case of ID 2, the name is HWAYANG ELEMENTARY SCHOOL MAIN ENTRANCE, type information is ENTRANCE, and DP information is N. In the case of ID 3, the name is HWAYANG ELEMENTARY SCHOOL BACK GATE, type information is ENTRANCE, and DP information is N.

FIG. 34 illustrates an example of a POI relation table based on the POI table shown in FIG. 33.

Referring to FIG. 34, the POI relation table associated with map data of HWAYANG ELEMENTARY SCHOOL includes information such as a PID, a CID, a tree name, and a search flag. The PID indicates an ID associated with the POI table. The CID indicates a corresponding ID in the POI table. For example, when the tree name is MAIN ENTRANCE, HWAYANG ELEMENTARY SCHOOL MAIN ENTRANCE is a name associated with HWAYANG ELEMENTARY SCHOOL in the POI table shown in FIG. 33. Accordingly, the PID is '1' corresponding to the ID of HWAYANG ELEMENTARY SCHOOL. The CID is '2' corresponding to the ID of HWAYANG ELEMENTARY SCHOOL MAIN ENTRANCE. The search flag information is a representative search. When the tree name is BACK GATE, HWAYANG ELEMENTARY SCHOOL BACK GATE is a name associated with HWAYANG ELEMENTARY SCHOOL in the POI table of FIG. 33. Accordingly, the PID is '1' corresponding to the ID of HWAYANG ELEMENTARY SCHOOL. The CID is '3' corresponding to the ID of HWAYANG ELEMENTARY SCHOOL BACK GATE. The search flag information is an independent search.

Figure 35:
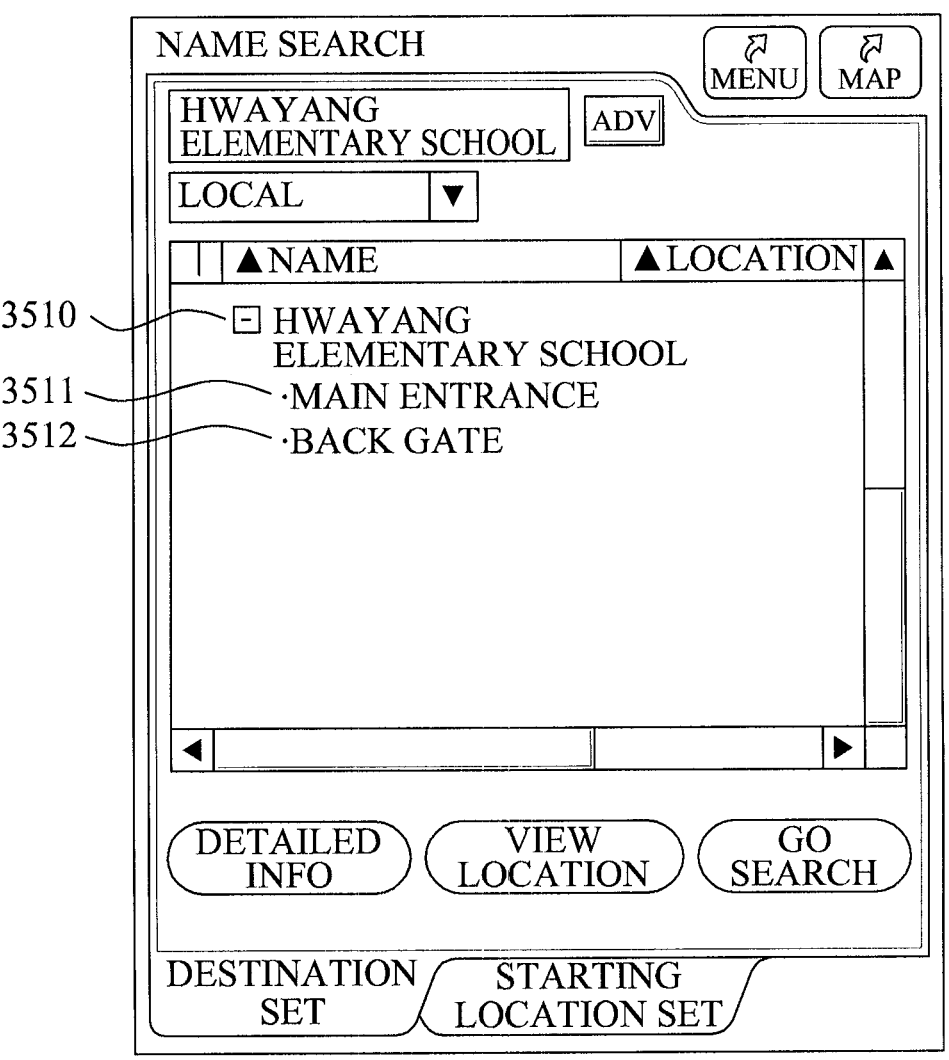
FIG. 35 illustrates an example of a name search result based on the POI relation table shown in FIG. 34.

FIG. 35 illustrates an example of a name search result based on the POI relation table shown in FIG. 34.

Referring to FIG. 35, a view 3500 indicates an example of a name search result screen associated with HWAYANG ELEMENTARY SCHOOL. HWAYANG ELEMENTARY SCHOOL 3510 corresponds to the upper tree structure. MAIN ENTRANCE 3511 corresponds to the lower tree structure and indicates a main entrance of HWAYANG elementary school. BACK GATE 3512 also corresponds to the lower tree structure and indicates a back gate of HWAYANG elementary school.

As described above, according to the present invention, it is possible to provide a name search result in the tree structure that can accurately display a location of a school, a location of a main entrance thereof, and a back gate thereof in school map data with two entrances.

Figure 36:
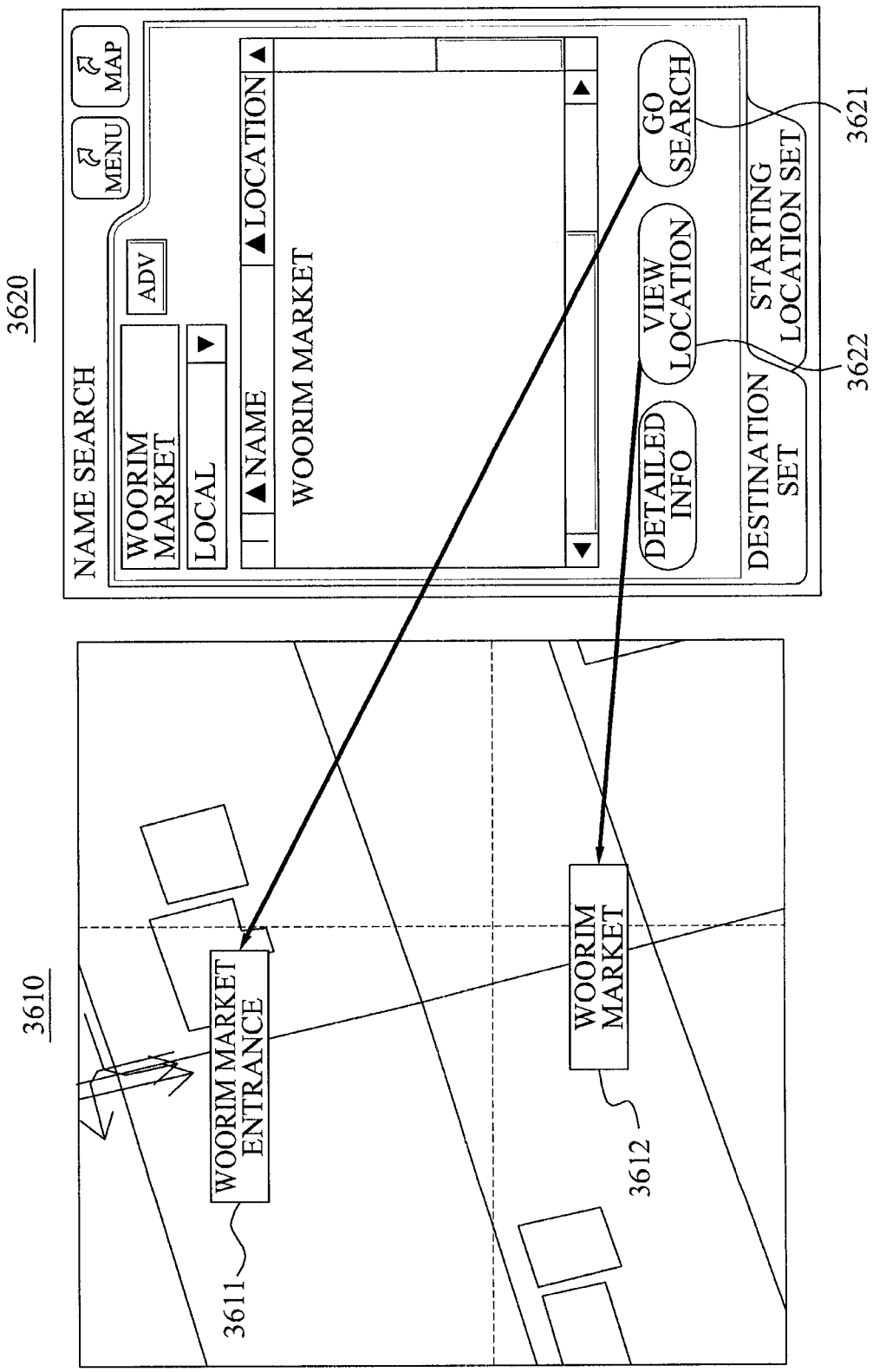
FIG. 36 illustrates an example of a name search and map data including a traffic-prohibited road according to an embodiment of the present invention.

FIG. 36 illustrates an example of map data 3610 that includes a traffic-prohibited road and a name search result according to an embodiment of the present invention.

Referring to FIG. 36, the map data 3610 indicates an example of map data associated with WOORIM MARKET that includes the traffic-prohibited road. A view 3620 indicates the name search result associated with WOORIM MARKET. A menu selection 3621 indicates a go search menu selection. A menu selection 3622 indicates a location view menu selection. A POI 3611 indicates a location of WOORIM MARKET ENTRANCE when the go search menu selection is selected. A POI 3612 indicates a location of WOORIM MARKET when the location view menu selection is selected.

As described above, according to the present invention, when map data includes a traffic-prohibited road, it is possible to display only location information instead of directly displaying the entrance information since the traffic is prohibited. Accordingly, a user may readily verify that the traffic-prohibited road is included.

FIG. 37 illustrates an example of a POI table corresponding to the map data 3610 shown in FIG. 36.

Referring to FIG. 37, the POI table corresponding to the map data 3610 associated with WOORIM MARKET includes information such as an ID, a name, a type, and a DP. In the case of ID 1, the name is WOORIM MARKET, type information is MARKET, and DP information is Y. In the case of ID 2, the name is WOORIM MARKET ENTRANCE, type information is ENTRANCE, and DP information is N.

FIG. 38 illustrates an example of a POI relation table based on the POI table shown in FIG. 37.

Referring to FIG. 38, the POI relation table associated with map data of WOORIM MARKET includes information such as a PID, a CID, a tree name, and a search flag. The PID indicates an ID associated with the POI table. The CID indicates a corresponding ID in the POI table. For example, when the tree name is ENTRANCE, WOORIM MARKET ENTRANCE is a name associated with WOORIM MARKET in the POI table of FIG. 33. Accordingly, the PID is '1' corresponding to the ID of WOORIM MARKET. The CID is '2' corresponding to the ID of WOORIM MARKET ENTRANCE. The search flag information is a representative search.

Figure 39:
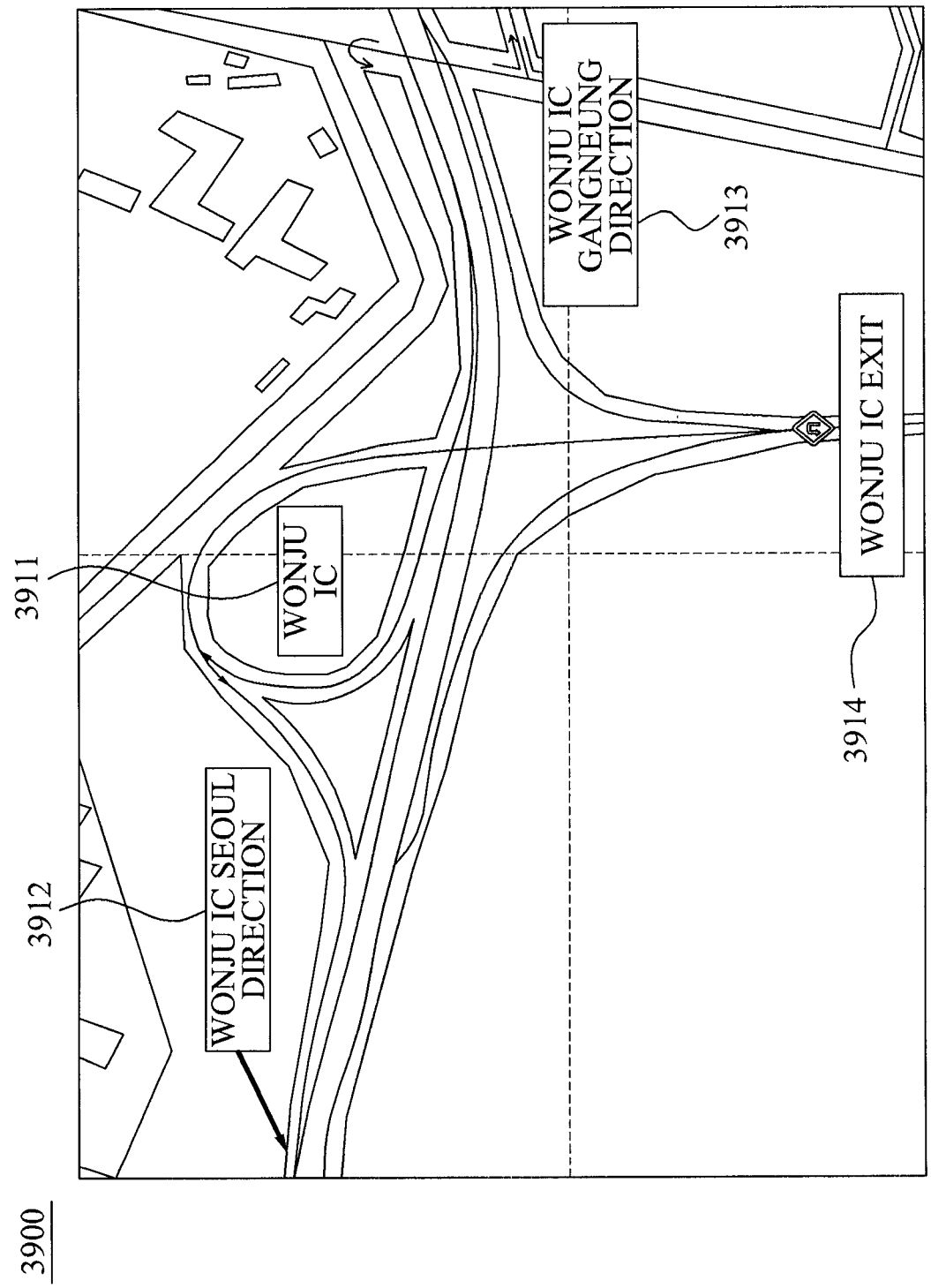
FIG. 39 illustrates an example of highway IC map data according to an embodiment of the present invention.

FIG. 39 illustrates an example of highway IC map data 3900 according to an embodiment of the present invention.

Referring to FIG. 39, the highway IC map data 3900 indicates an example of map data associated with WONJU IC. A POI 3911 indicates a location of WONJU IC. A POI 3912 indicates a location of WONJU IC SEOUL DIRECTION. A POI 3913 indicates a location of WONJU IC GANGNEUNG DIRECTION. A POI 3914 indicates a location of WONJU IC EXIT.

Figure 8:
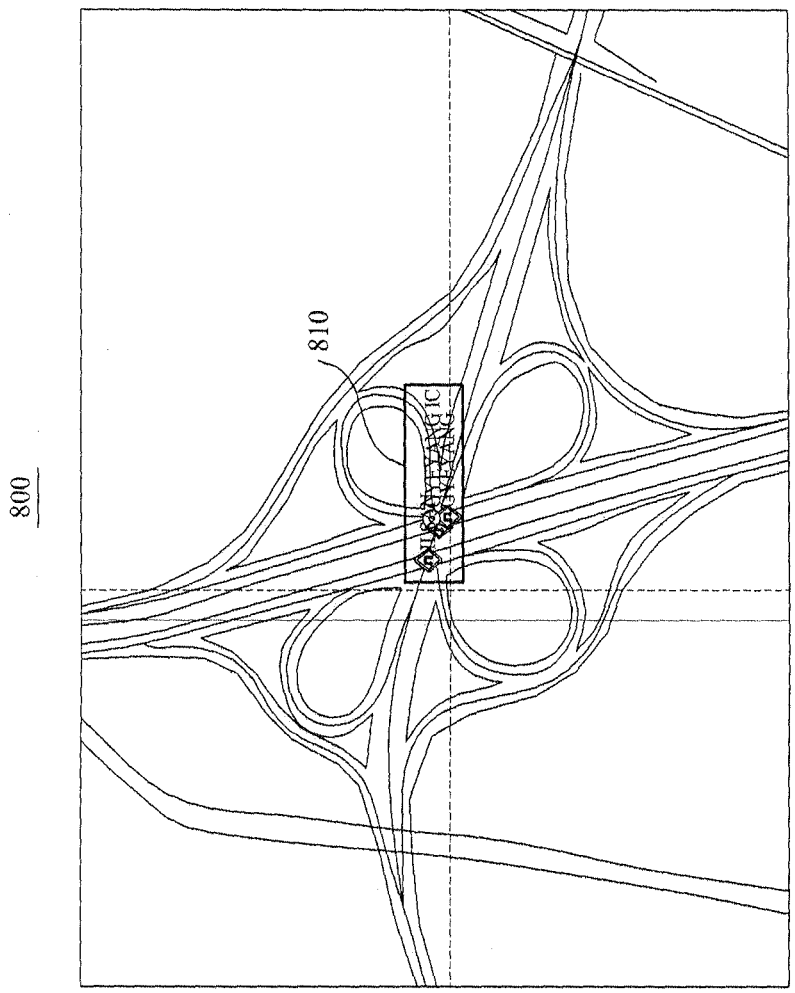
FIG. 8 illustrates an example of map data when a highway IC has two exits according to the conventional art.

As described above, according to the present invention, it is possible to provide map data that includes highway IC location information and various types of direction information and exit information, which is different from the conventional art described with reference to FIG. 8.

FIG. 40 illustrates an example of a POI table corresponding to the highway IC map data 3900 shown in FIG. 39.

Referring to FIG. 40, the POI table corresponding to map data associated with WONJU IC includes information such as an ID, a name, a type, and a DP. In the case of ID 1, the name is WONJU IC, type information is IC, and DP information is Y. In the case of ID 2, the name is WONJU IC SEOUL DIRECTION, type information is ENTRANCE, and DP information is N. In the case of ID 3, the name is WONJU IC GANGLEUNG DIRECTION, type information is ENTRANCE, and DP information is N. In the case of ID 4, the name is WONJU IC EXIT, type information is ENTRANCE, and DP information is N.

FIG. 41 illustrates an example of a POI relation table based on the POI table shown in FIG. 40.

Referring to FIG. 41, the POI relation table associated with map data of WONJU IC includes information such as a PID, a CID, a tree name, and a search flag. The PID indicates an ID associated with the POI table. The CID indicates a corresponding ID in the POI table. For example, when the tree name is SEOUL DIRECTION, WONJU IC SEOUL DIRECTION is the name associated with WONJU IC in the POI table of FIG. 40. Accordingly, the PID is '1' corresponding to the ID of WONJU IC. The CID is '2' corresponding to the ID of WONJU IC SEOUL DIRECTION shown in FIG. 40. The search flag information is an independent search or a representative search.

Figure 42:
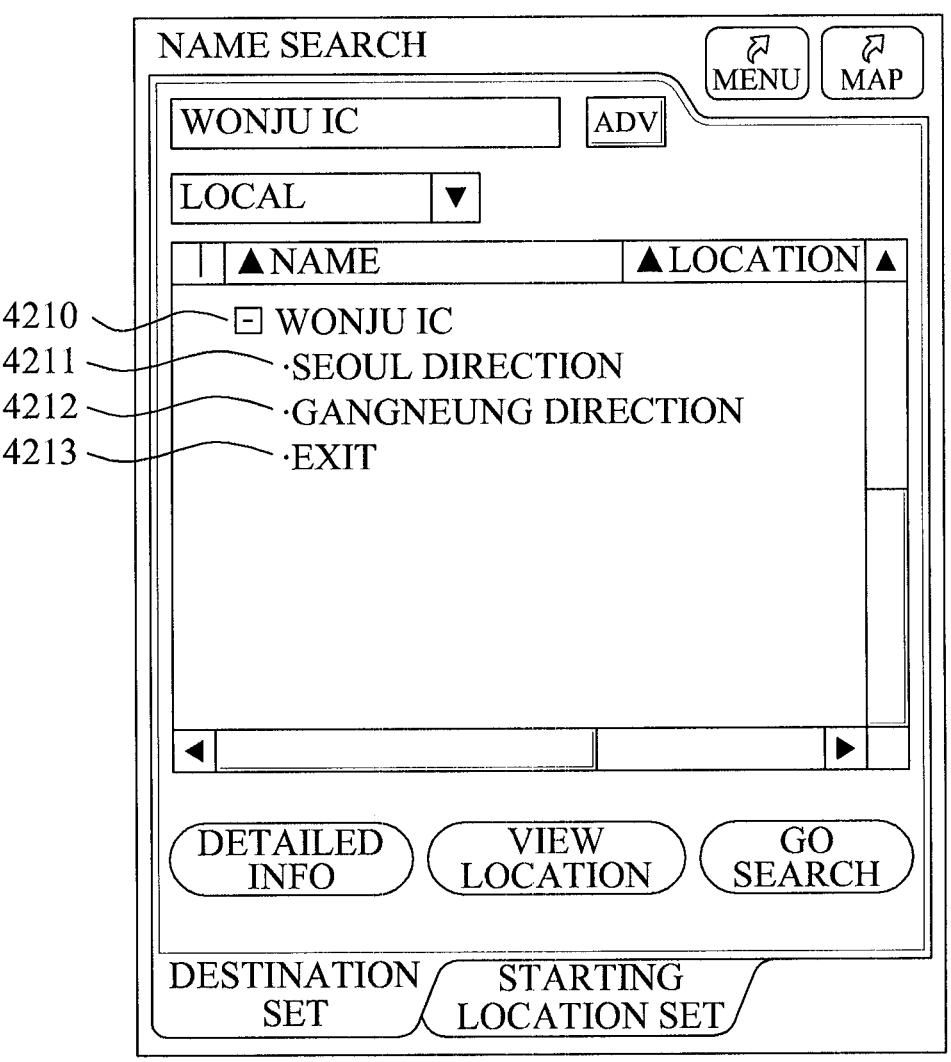
FIG. 42 illustrates an example of a name search result based on the POI relation table shown in FIG. 41.

FIG. 42 illustrates an example of a name search result based on the POI relation table shown in FIG. 41.

Referring to FIG. 42, a view 4200 indicates an example of a name search result screen associated with WONJU IC. WONJU IC 4210 corresponds to the upper tree structure of the name search result associated with WONJU IC. SEOUL DIRECTION 4211 indicates WONJU IC SEOUL DIRECTION corresponding to the lower tree structure. GANGNEUNG DIRECTION 4212 indicates WONJU IC GANGNEUNG DIRECTION corresponding to the lower tree structure. EXIT 4213 indicates WONJU IC EXIT corresponding to the lower tree structure.

As described above, according to the present invention, it is possible to provide a name search result in the tree structure to accurately display an IC location, direction information, and IC exit information in highway IC map data.

Figure 43:
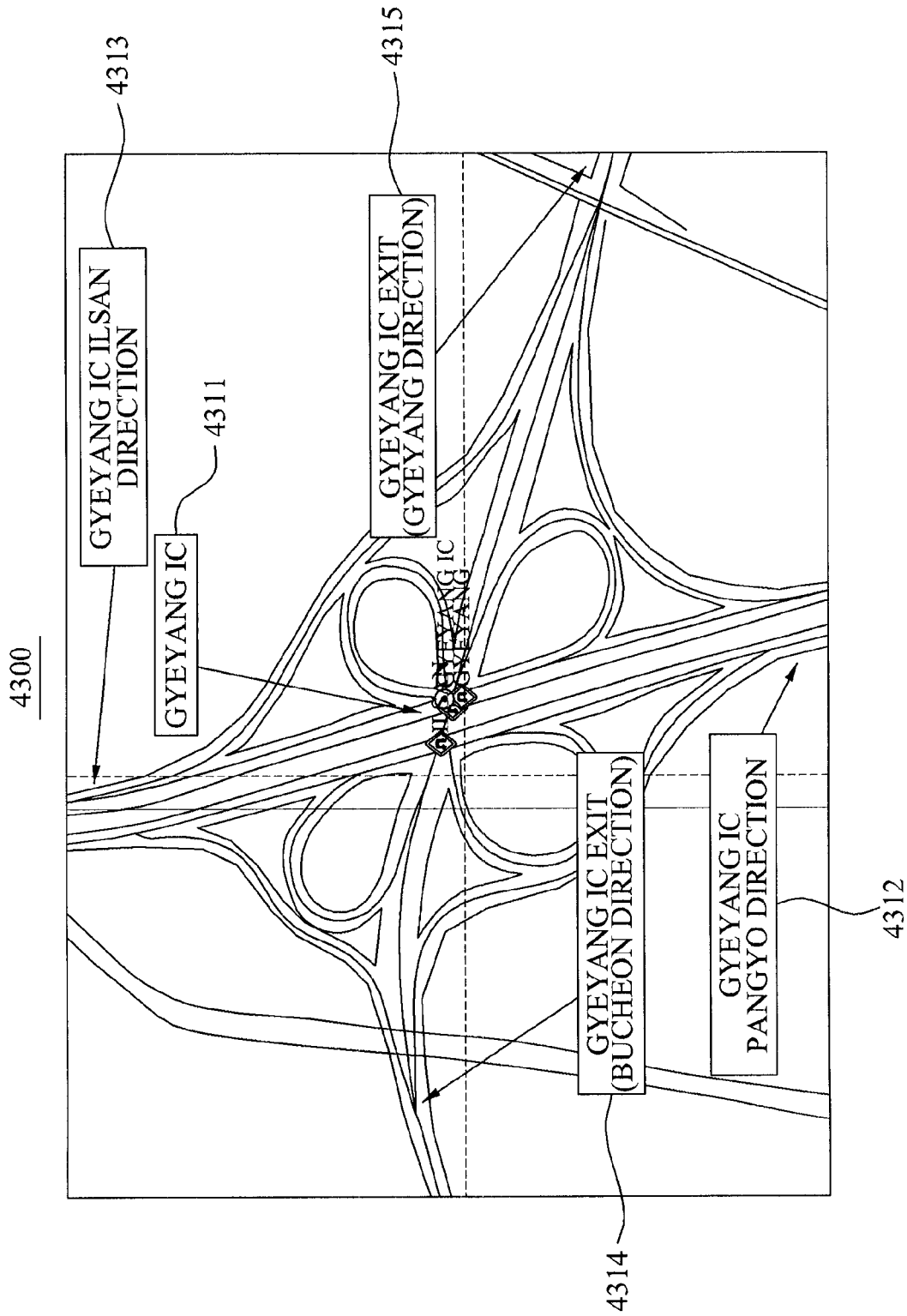
FIG. 43 illustrates another example of highway IC map data according to an embodiment of the present invention.

FIG. 43 illustrates another example of highway IC map data 4300 according to an embodiment of the present invention.

Referring to FIG. 43, the highway IC map data 4300 indicates an example of map data associated with GYEYANG IC. A POI 4311 indicates a location of GYEYANG IC. A POI 4312 indicates a location of GYEYANG IC PANGYO DIRECTION. A POI 4313 indicates a location of GYEYANG IC ILSAN DIRECTION. A POI 4314 indicates a location of GYEYANG IC EXIT BUCHEON DIRECTION. A POI 4315 indicates a location of GYEYANG IC EXIT GYEYANG DIRECTION.

As described above, according to the present invention, it is possible to provide map data that includes a location of GYEYANG IC and a location of each direction and exit of GYEYANG IC.

FIG. 44 illustrates an example of a POI table corresponding to the highway IC map data shown in FIG. 43.

Referring to FIG. 44, the POI table corresponding to map data of GYEYANG IC includes information such as an ID, a name, a type, and a DP. In the case of ID 1, the name is GYEYANG IC, type information is IC, and DP information is Y. In the case of ID 2, the name is GYEYANG IC PANGYO DIRECTION, type information is ENTRANCE, and DP information is N. In the case of ID 3, the name is GYEYANG IC ILSAN DIRECTION, type information is ENTRANCE, and DP information is N. In the case of ID 4, the name is GYEYANG IC EXIT (BUCHEON DIRECTION), type information is ENTRANCE, and DP information is N. In the case of ID 5, the name is GYEYANG IC EXIT (GYEYANG DIRECTION), type information is ENTRANCE, and DP information is N.

FIG. 45 illustrates an example of a POI relation table based on the POI table shown in FIG. 44.

Referring to FIG. 45, the POI relation table associated with map data of GYEYANG IC includes information such as a PID, a CID, a tree name, and a search flag. The PID indicates an ID associated with the POI table. The CID indicates an ID in the POI table. For example, when the tree name is PANGYO DIRECTION, GYEYANG IC PANGYO DIRECTION is a name associated with GYEYANG IC in the POI table of FIG. 44. Accordingly, the PID is '1' corresponding to the ID of GYEYANG IC. The CID is '2' corresponding to the ID of GYEYANG IC PANGYO DIRECTION shown in FIG. 44. The search flag information is an independent search.

Figure 46:
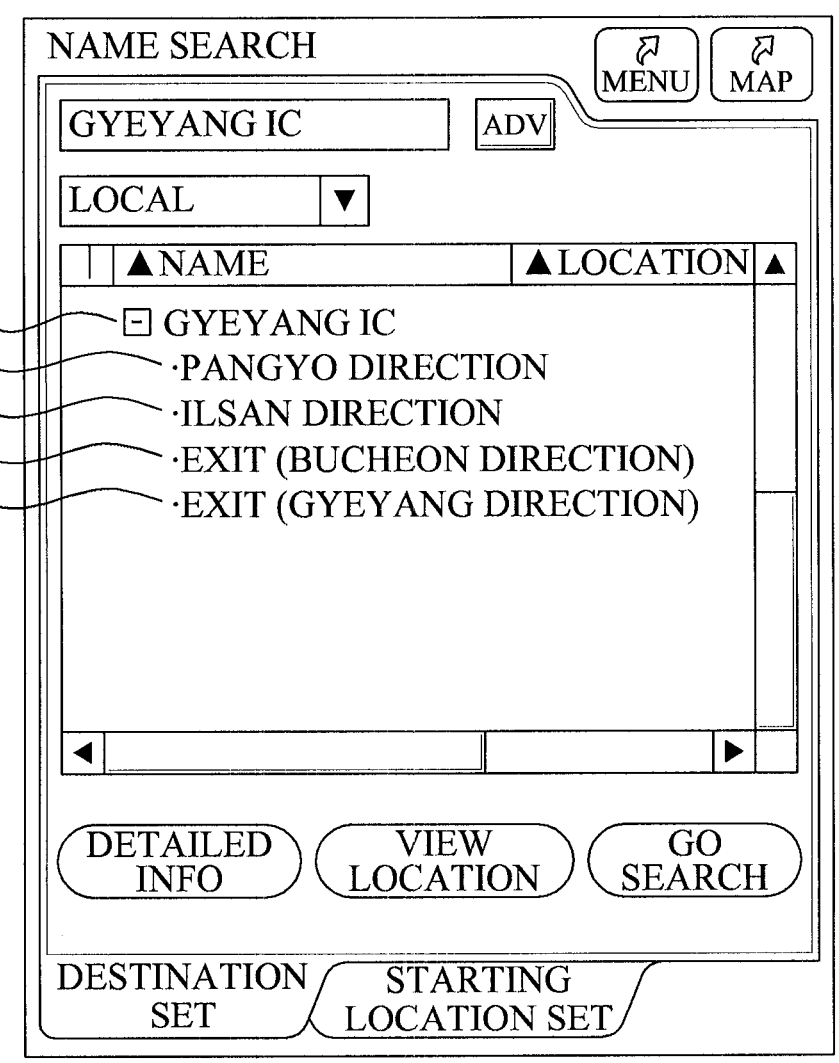
FIG. 46 illustrates an example of a name search result based on the POI relation table shown in FIG. 45.

FIG. 46 illustrates an example of a name search result based on the POI relation table shown in FIG. 45.

Referring to FIG. 46, a view 4600 indicates an example of a name search result screen associated with GYEYANG IC. GYEYANG IC 4610 corresponds to the upper tree structure of the name search result associated with GYEYANG IC. PANGYO DIRECTION 4611 indicates GYEYANG IC PANGYO DIRECTION corresponding to the lower tree structure. ILSAN DIRECTION 4612 indicates GYEYANG IC ILSAN DIRECTION corresponding to the lower tree structure. EXIT (GYEYANG IC) 4613 indicates GYEYANG IC EXIT (GYEYANG DIRECTION) corresponding to the lower tree structure. EXIT (BUCHEON DIRECTION) 4614 indicates GYEYANG IC EXIT (BUCHEON DIRECTION) corresponding to the lower tree structure.

As described above, according to the present invention, it is possible to provide a name search result in the tree structure to make it possible to accurately display IC location information, direction information, and IC exit information in highway IC map data.

Figure 47:
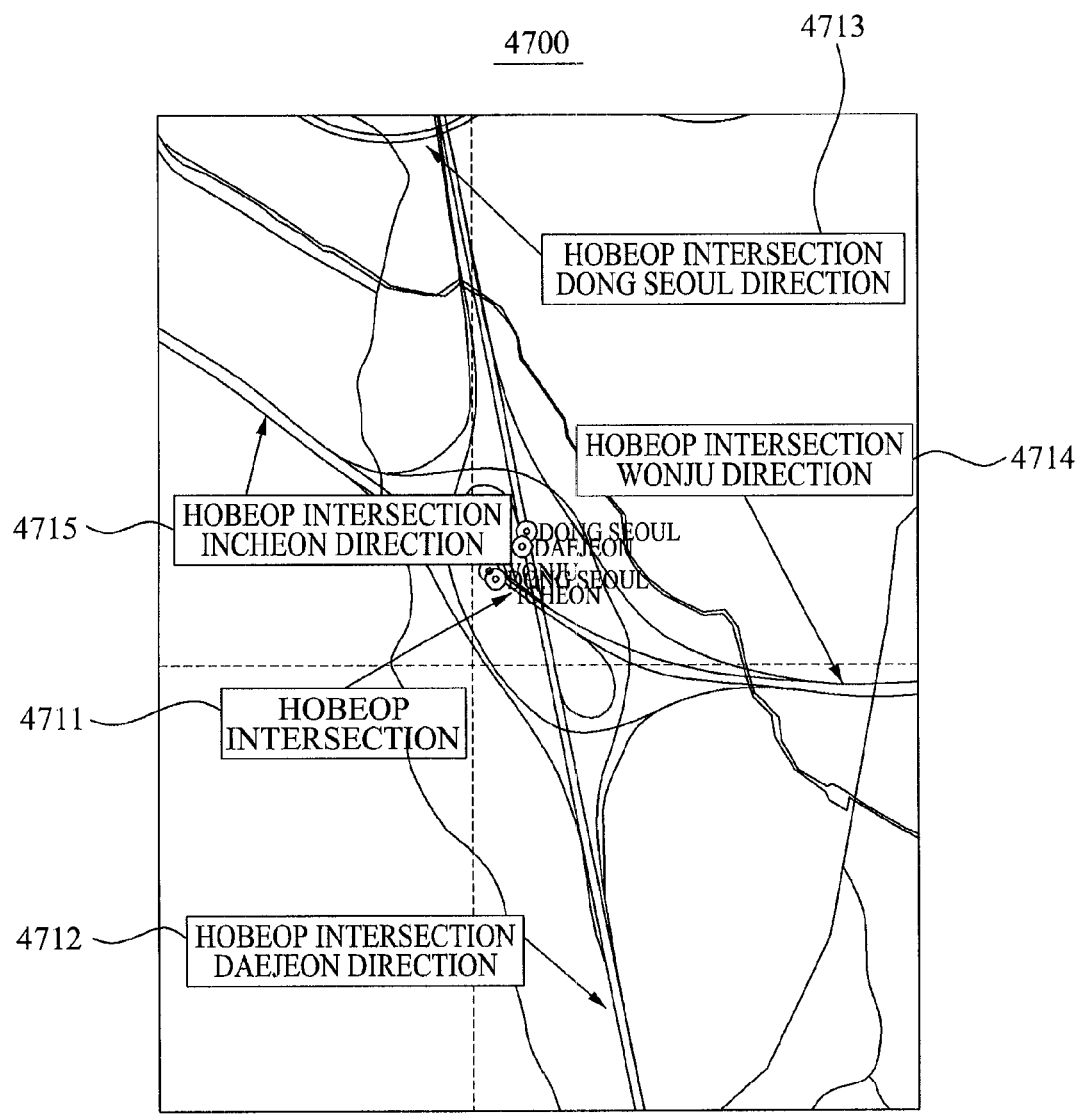
FIG. 47 illustrates an example of highway intersection map data according to an embodiment of the present invention.

FIG. 47 illustrates an example of highway intersection map data 4700 according to an embodiment of the present invention.

Referring to FIG. 47, the highway intersection map data 4700 indicates an example of map data associated with HOBEOP INTERSECTION. A POI 4711 indicates a location of HOBEOP INTERSECTION. A POI 4712 indicates a location of HOBEOP INTERSECTION DAEJEON DIRECTION. A POI 4713 indicates a location of HOBEOP INTERSECTION DONG SEOUL DIRECTION. A POI 4714 indicates a location of HOBEOP INTERSECTION WONJU DIRECTION. A POI 4715 indicates a location of HOBEOP INTERSECTION EXIT INCHEON DIRECTION.

Figure 9:
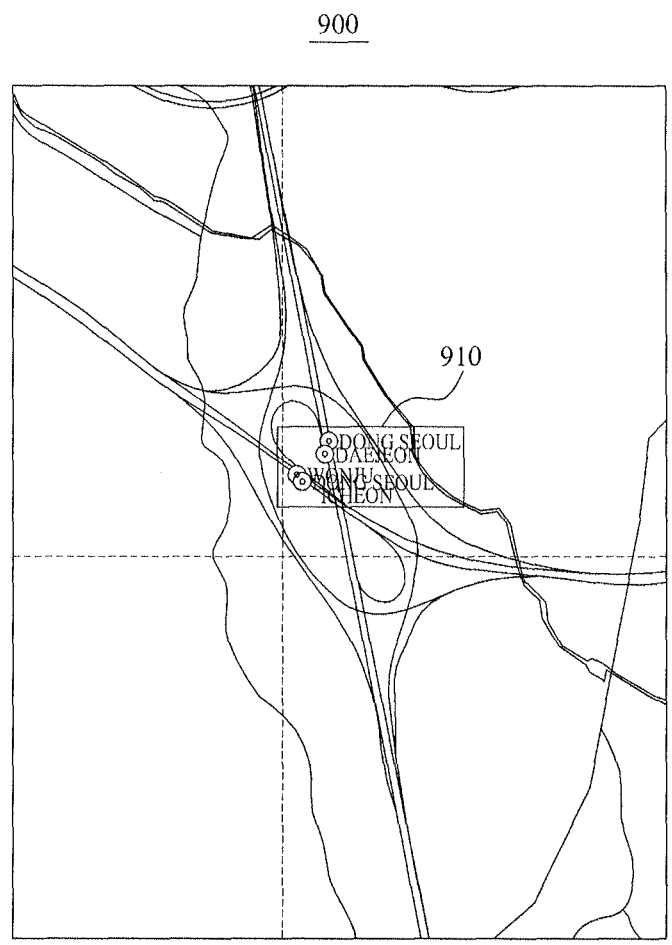
FIG. 9 illustrates an example of map data in a highway intersection according to the conventional art.

As described above, according to the present invention, it is possible to provide map data that includes a location of a highway intersection and a location of each direction associated with the highway intersection, which is different from the conventional art that provides only the location of the highway intersection, described above with reference to FIG. 9.

FIG. 48 illustrates an example of a POI table corresponding to the highway intersection map data shown in FIG. 47.

Referring to FIG. 48, the POI table corresponding to map data of HOBEOP INTERSECTION includes information such as an ID, a name, a type, and a DP. In the case of ID 1, the name is HOBEOP INTERSECTION, type information is INTERSECTION, and DP information is Y. In the case of ID 2, the name is HOBEOP INTERSECTION DAEJEON DIRECTION, type information is ENTRANCE, and DP information is N. In the case of ID 3, the name is HOBEOP INTERSECTION DONG SEOUL DIRECTION, type information is ENTRANCE, and DP information is N. In the case of ID 4, the name is HOBEOP INTERSECTION WONJU DIRECTION, type information is ENTRANCE, and DP information is N. In the case of ID 5, the name is HOBEOP INTERSECTION INCHEON DIRECTION, type information is ENTRANCE, and DP information is N.

FIG. 49 illustrates an example of a POI relation table based on the POI table shown in FIG. 48.

Figure 50:
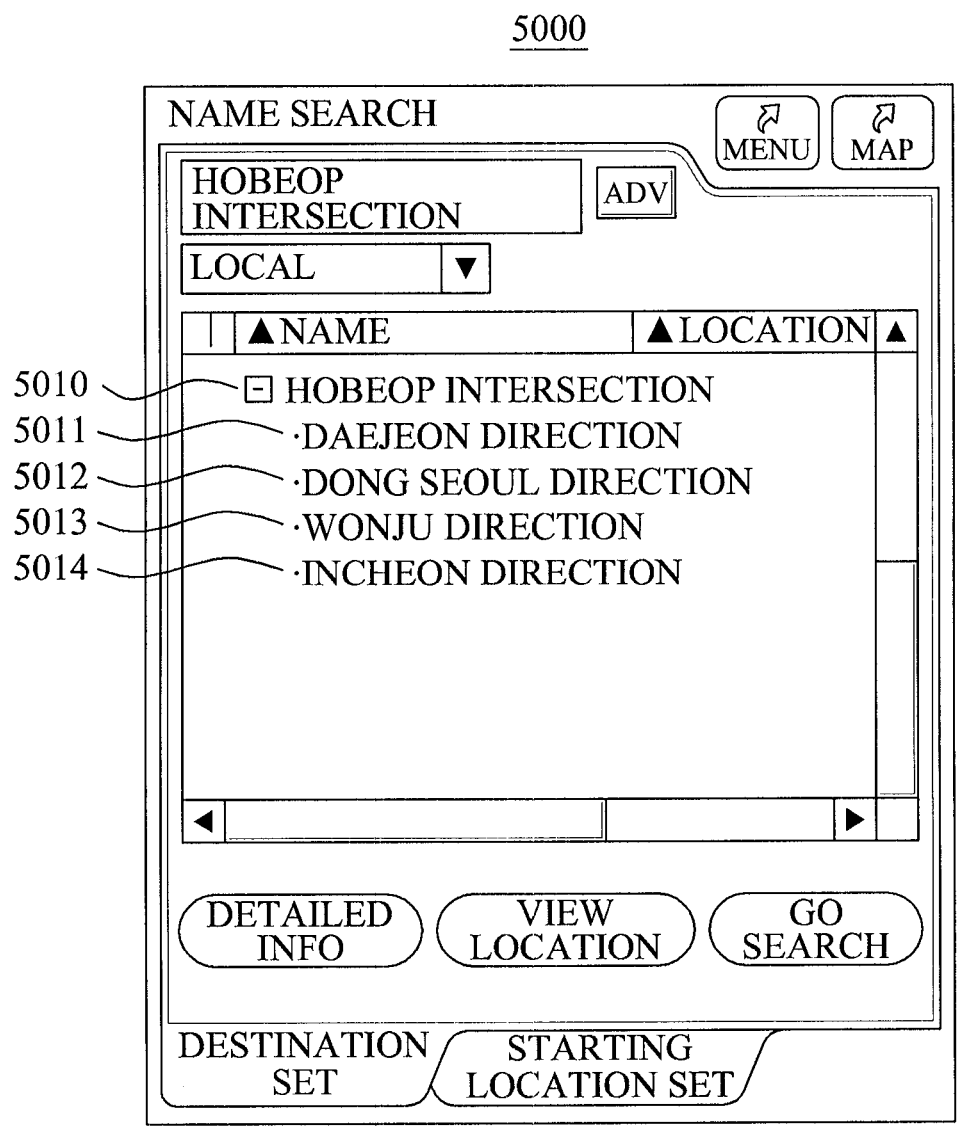
FIG. 50 illustrates an example of a name search result based on the POI relation table shown in FIG. 49.

Referring to FIG. 49, the POI relation table associated with map data of HOBEOP INTERSECTION includes information such as a PID, a CID, a tree name, and a search flag. The PID indicates an ID associated with the POI table. The CID indicates a corresponding ID in the POI table. For example, when the tree name is DAEJEON DIRECTION, HOBEOP INTERSECTION DAEJEON DIRECTION is a name associated with HOBEOP INTERSECTION in the POI table of FIG. 48. Accordingly, the PID is '1' corresponding to the ID of HOBEOP INTERSECTION. The CID is '2' corresponding to the ID of HOBEOP INTERSECTION DAEJEON DIRECTION. The search flag information is an independent search. FIG. 50 illustrates an example of a name search result based on the POI relation table shown in FIG. 49.

Referring to FIG. 50, a view 5000 indicates an example of a name search result screen associated with HOBEOP INTERSECTION. HOBEOP INTERSECTION 5010 corresponds to the upper tree structure of the name search result associated with HOBEOP INTERSECTION. DAEJEON DIRECTION 5011 indicates HOBEOP INTERSECTION DAEJEON DIRECTION corresponding to the lower tree structure. DONG SEOUL DIRECTION 5012 indicates HOBEOP INTERSECTION DONG SEOUL DIRECTION corresponding to the lower tree structure. WONJU DIRECTION 5013 indicates HOBEOP INTERSECTION WONJU DIRECTION corresponding to the lower tree structure. INCHEON DIRECTION 5014 indicates HOBEOP INTERSECTION INCHEON DIRECTION corresponding to the lower tree structure.

As described above, according to the present invention, it is possible to provide a name search result in the tree structure to make it possible to accurately display intersection location information and direction location in map data of a highway intersection.

FIG. 51 illustrates an example of a POI table corresponding to Olympic park according to an embodiment of the present invention.

Referring to FIG. 51, the POI table corresponding to map data of OLYMPIC PARK includes information such as an ID, a name, a type, and a DP. In the case of ID 1, the name is OLYMPIC PARK, type information is PARK, and DP information is Y. In the case of ID 3, the name is OLYMPIC PARK CYCLODROME, type information is CYCLODROME, and DP information is Y. In the case of ID 4, the name is MONGCHONTOSUNG, type information is ATTRACTION SITE, and DP information is Y. In the case of ID 5, the name is OLYMPIC PARK SOUTH GATE 2, type information is ENTRANCE, and DP information is N. In the case of ID 6, the name is OLYMPIC PARK NORTH GATE 2, type information is ENTRANCE, and DP information is N. In the case of ID 7, the name is OLYMPIC HALL, type information is CULTURE HALL, and DP information is Y. In the case of ID 8, the name is FOREIGN EXCHANGE BANK OLYMPIC BRANCH, type information is BANK, and DP information Y. In the case of ID 9, the name is OLYMPIC HALL ENTRANCE, type information is ENTRANCE, and DP information is N. In the case of ID 10, the name is OLYMPIC HALL PARKING LOT, type information is PARKING LOT, and DP information is Y. In the case of ID 11, the name is OLYMPIC PARKTEL, type information is HOTEL, and DP information is Y. In the case of ID 12, the name is OLYMPIC PARKTEL PARKING LOT ENTRANCE, type information is PARKING LOT, and DP information is N.

FIG. 52 illustrates an example of a POI relation table based on the POI table shown in FIG. 51.

Referring to FIG. 52, the POI relation table associated with OLYMPIC PARK map data includes information such as a PID, a CID, a tree name, and a search flag. The PID indicates an ID associated with the POI table. The CID indicates a corresponding ID in the POI table. For example, when the tree name is CYCLODROME, OLYMPIC PARK CYCLODROME is a name associated with OLYMPIC PARK in the POI table shown in FIG. 51. Accordingly, the PID is '1' corresponding to the ID of OLYMPIC PARK. The CID is '3' corresponding to the ID of OLYMPIC PARK CYCLODROME. The search flag information is only a search. As another example, when the tree name is SOUTH GATE 2, OLYMPIC PARK SOUTH GATE 2 is a name associated with OLYMPIC PARK in the POI table shown FIG. 51. Accordingly, the PID is '1' corresponding to the ID of OLYMPIC PARK. The CID is '5' corresponding to the ID of OLYMPIC PARK SOUTH GATE 2. The search flag information is an independent search.

Figure 53:
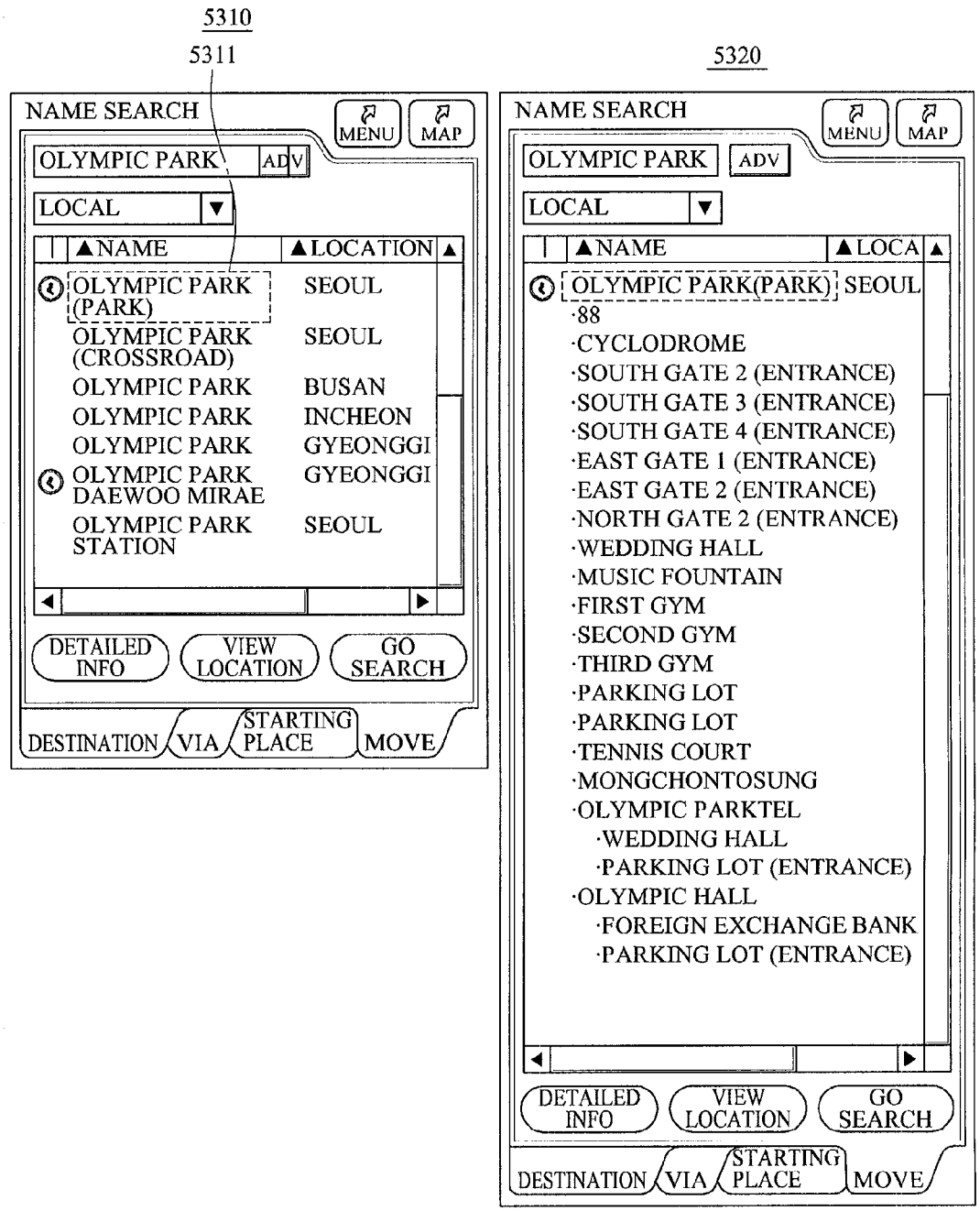
FIG. 53 illustrates an example of a name search result associated with Olympic park.

FIG. 53 illustrates an example of a name search result of OLYMPIC PARK.

Referring to FIG. 53, a view 5310 indicates an example of the name search result of OLYMPIC PARK. OLYMPIC PARK (PARK) 5311 is retrieved as the name search result of OLYMPIC PARK. A view 5320 indicates information about various types of facilities associated with OLYMPIC PARK in the tree structure as the cell 5311, that is, OLYMPIC PARK (PARK) is selected on the name search result screen.

Figure 54:
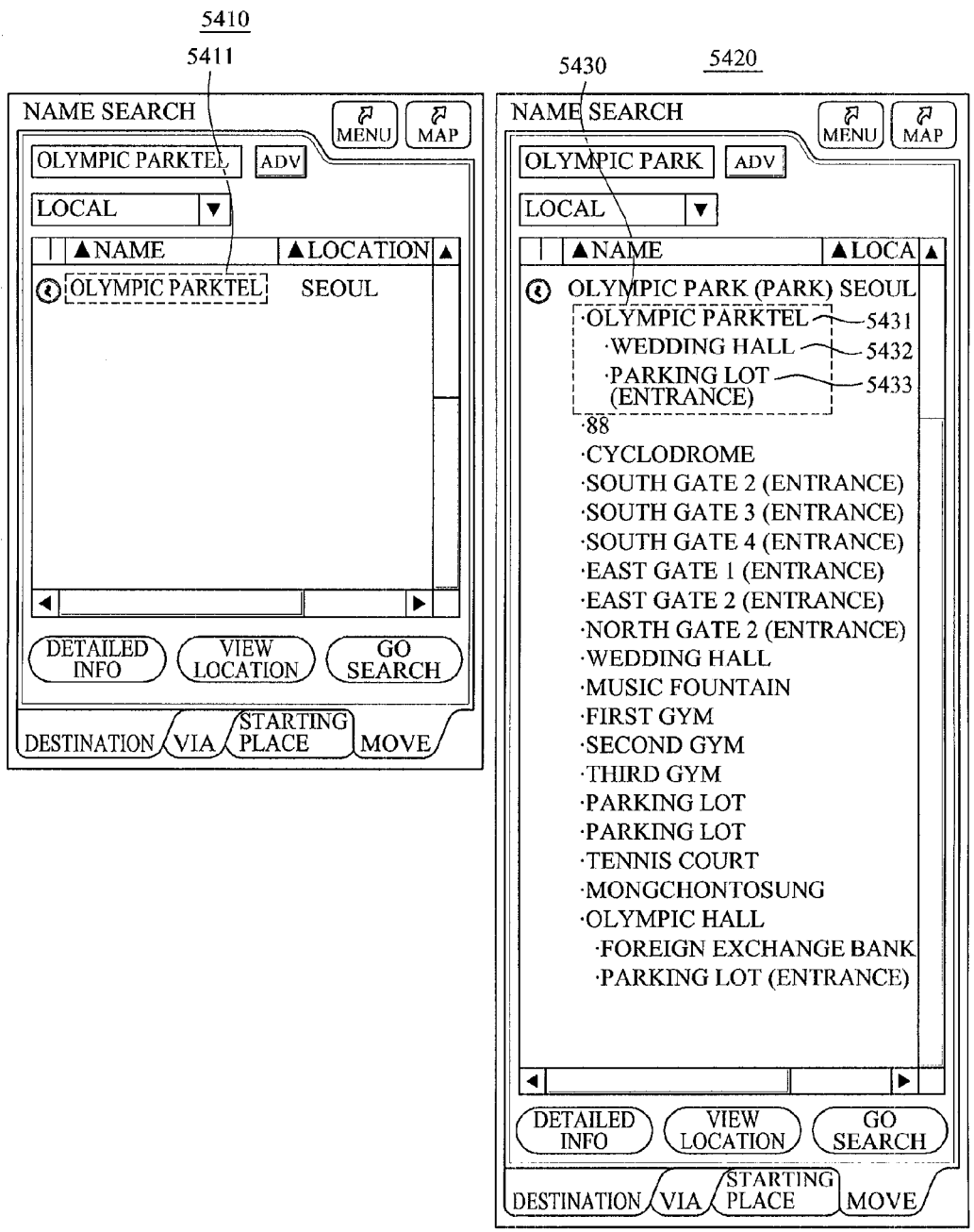
FIG. 54 illustrates an example of a name search result associated with Olympic Parktel.

FIG. 54 illustrates an example of a name search result of OLYMPIC PARKTEL.

Referring to FIG. 54, a view 5410 indicates an example of the name search result of OLYMPIC PARKTEL. OLYMPIC PARKTEL 5411 is retrieved as the name search result of OLYMPIC P. A view 5420 indicates an example of a name search result screen of OLYMPIC PARK. A box 5430 indicates OLYMPIC PARKTEL information. As OLYMPIC PARKTEL 5431 is selected, the OLYMPIC PARKTEL information 5430 indicates WEDDING HALL 5432 and PARKING LOT (ENTRANCE) 5433 correspond to the lower tree structure.

As described above, according to the present invention, it is possible to readily identify the relation between facilities in a very large place such as OLYMPIC PARK.

Figure 55:
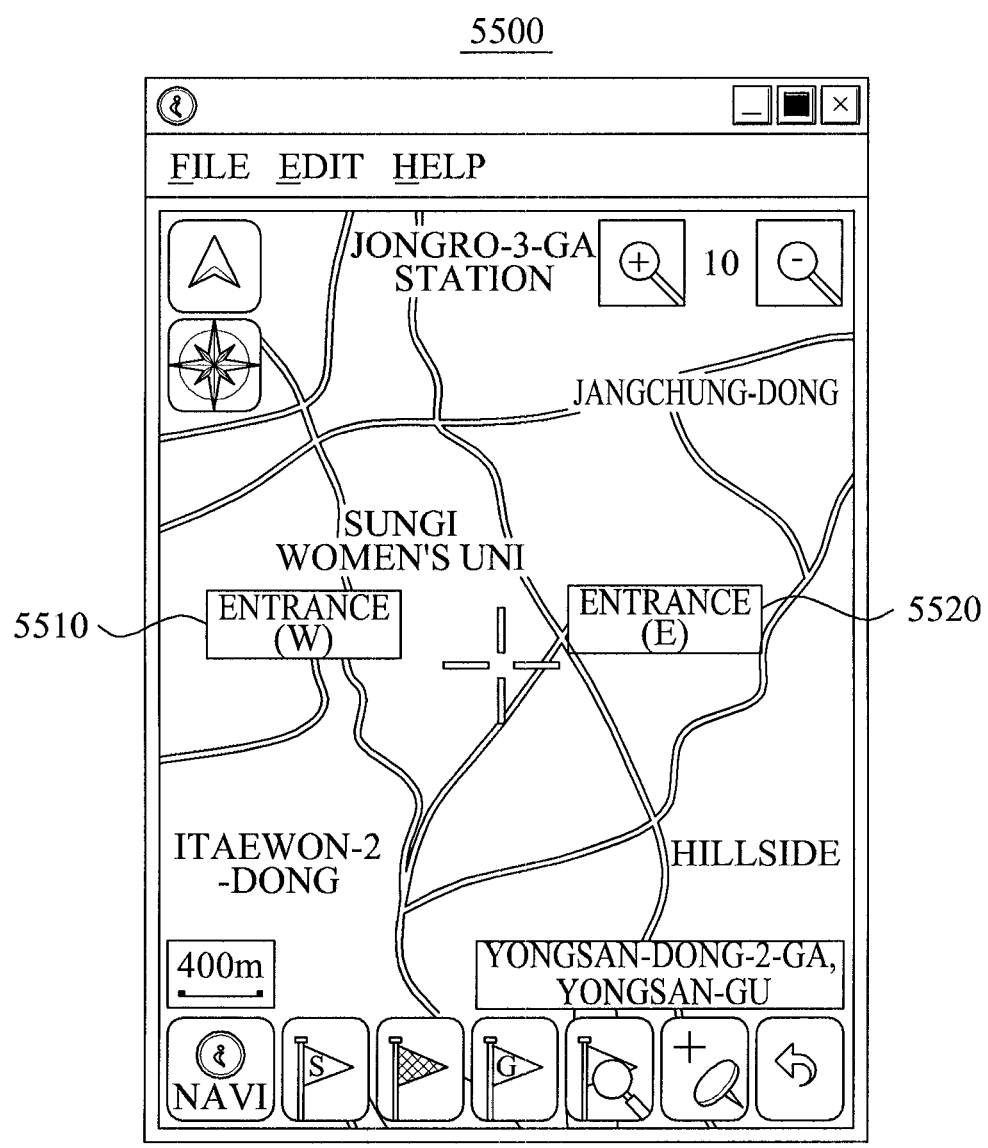
FIG. 55 illustrates an example of map data associated with a vehicle-prohibited region.

FIG. 55 illustrates an example of map data associated with a vehicle prohibited region.

Referring to FIG. 55, a view 5500 indicates an example of map data of NAMSAN Park that includes the vehicle prohibited region. A POI 5510 indicates a location where it is possible to start searching in ENTRANCE (W) when a starting place is near to the west entrance. A POI 5520 indicates a location where it is possible to start searching for ENTRANCE (E) when the starting place is near to the east entrance.

Figure 56:
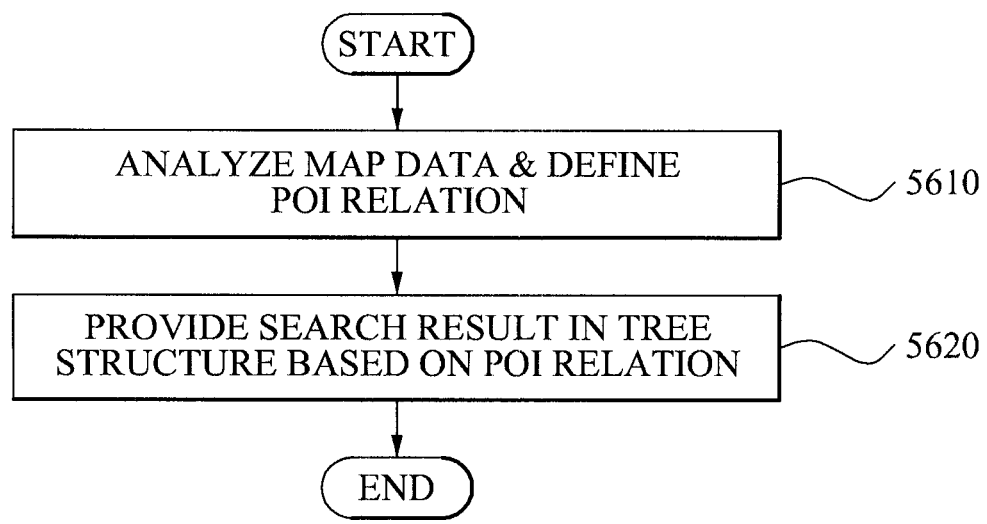
FIG. 56 is a flowchart illustrating a destination retrieving method according to an embodiment of the present invention.

FIG. 56 is a flowchart illustrating a name retrieving method according to an embodiment of the present invention.

Referring to FIG. 56, in operation 5610, a name retrieving system analyzes map data and defines a relation between POIs as a POI relation. Specifically, in operation S5610, the name retrieving system classifies DP coordinates and GP coordinates and defines the POI relation. Also, in operation 5610, when a plurality of equivalent names is retrieved in the same region, the name retrieving system may classify the plurality of equivalent names for each type and define the POI relation.

In operation 5620, the name retrieving system provides a search result in the tree structure based on the POI relation when retrieving a name. Specifically, in operation 5620, the name retrieving system displays a location of POI based on the DP coordinates and provides a search result of a route to a search target based on the GP coordinates. Also, in operation 5620, the name retrieving system receives a search request for the name, receives a selection on relational information in the tree structure based on the name, and provides a list associated with the selected regional information in the tree structure. The list may include a regional information list associated with the name. Also, the regional information list associated with the name may include an apartment district number list or a subway exit number list.

Figure 57:
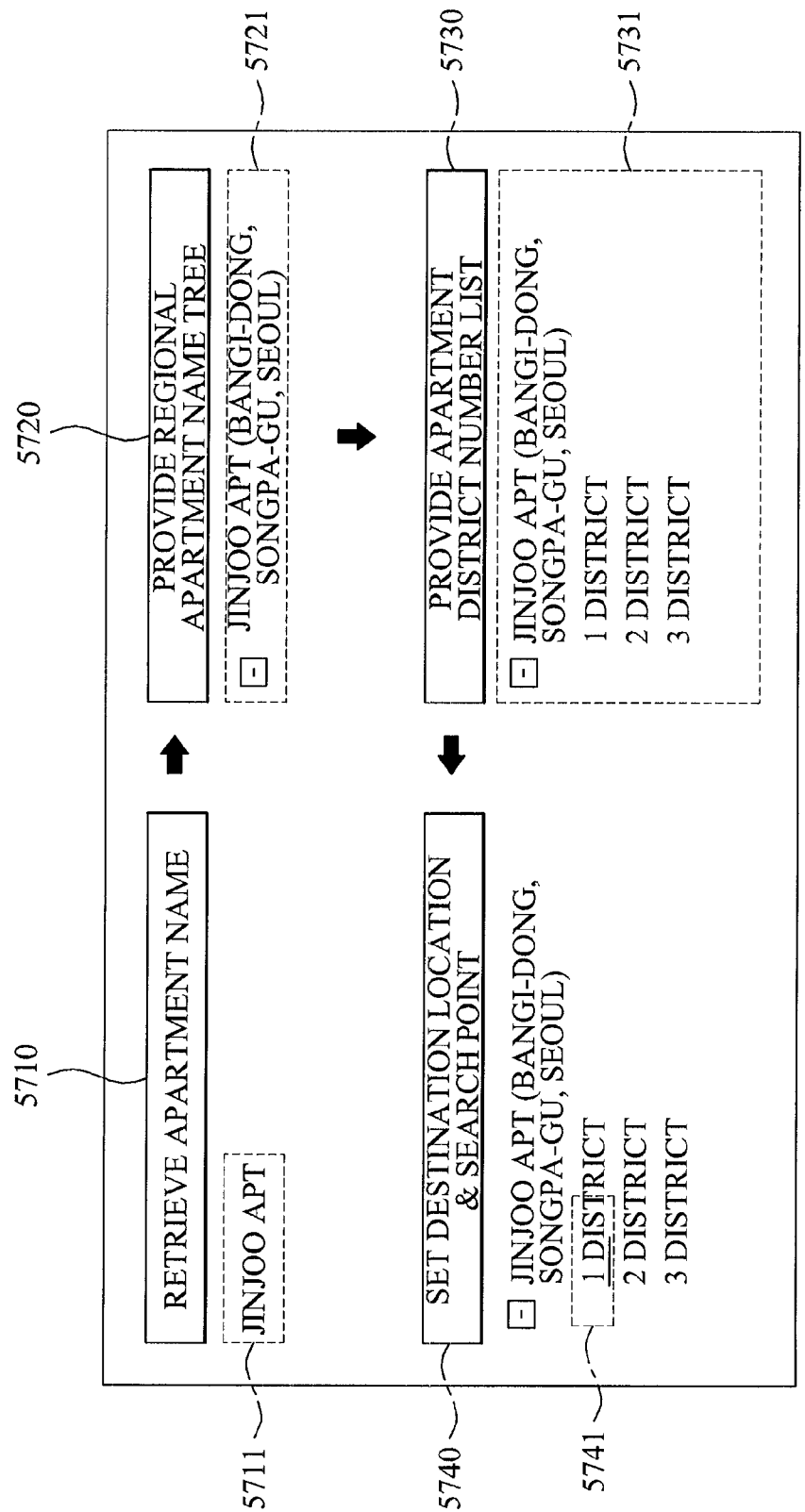
FIG. 57 illustrates an example of retrieving a destination using an apartment district number.

FIG. 57 illustrates an example of retrieving a search target using an apartment district number.

Referring to FIG. 57, in operation 5710, the name retrieving system may retrieve JINJOO APT 5711 as an apartment name.

In operation 5720, the name retrieving system may provide the tree structure associated with JINJOO APT (BANGI-DONG, SONGPA-GU, SEOUL) 5721 as a regional apartment name tree.

In operation 5730, the name retrieving system may provide an apartment district number list 5731 of JINJOO APT selected from the regional apartment name tree.

In operation 5740, the name retrieving system may select '1 DISTRICT' 5741 from the apartment district number list 5731 and set '1 DISTRICT' as a destination location and a search point.

As described above, according to the present invention, it is possible to verify a regional apartment name tree through apartment name search and provide a search result associated with an apartment district number that a user desires to retrieve as a search target location from an apartment district number list.

Figure 58:
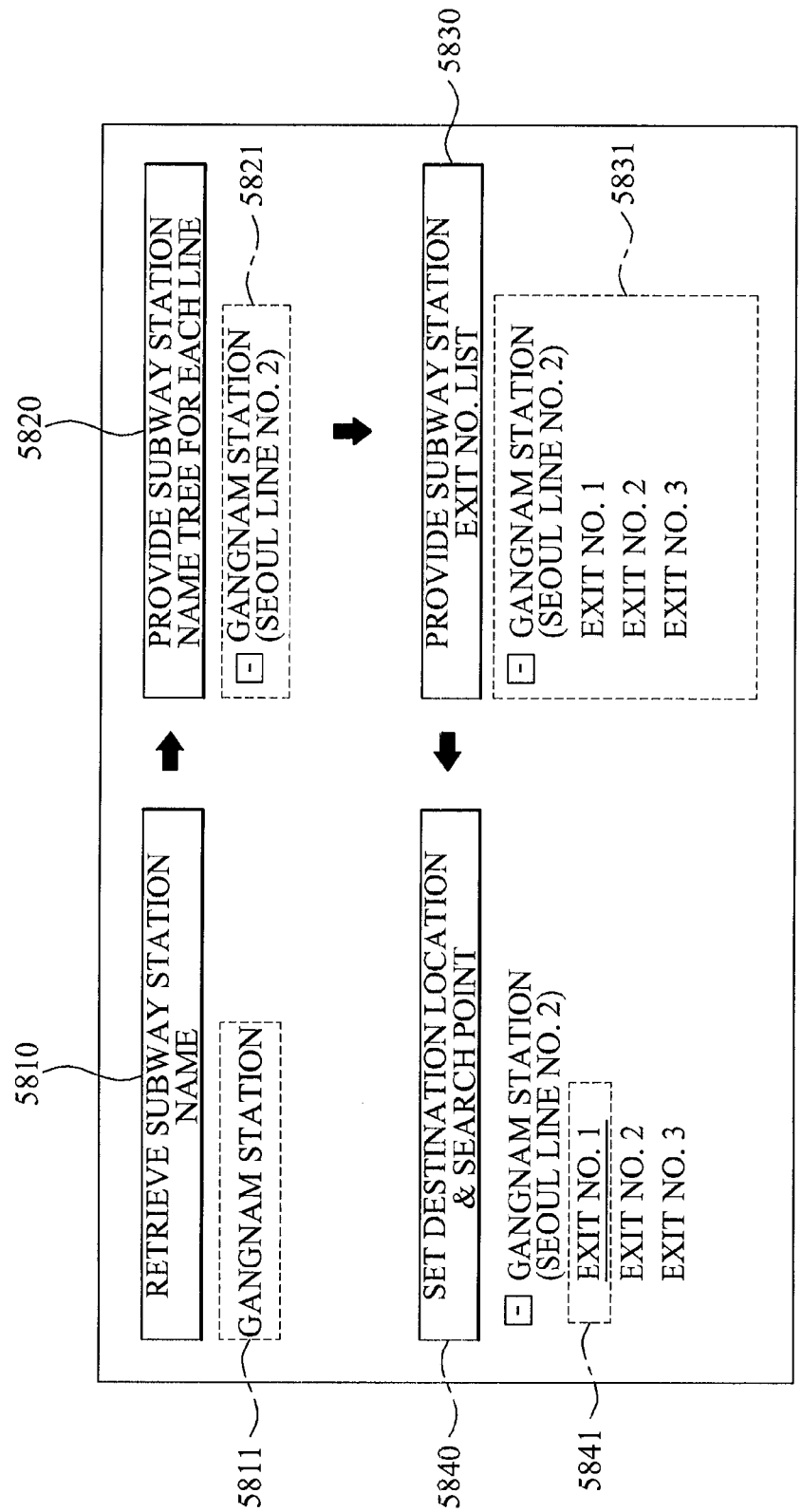
FIG. 58 illustrates an example of retrieving a destination using a subway entrance number.

FIG. 58 illustrates an example of retrieving a search target using a subway station exit number.

Referring to FIG. 58, in operation 5810, the name retrieving system may retrieve GANGNAM STATION 5811 as a subway station name.

In operation 5820, the name retrieving system may provide the tree structure associated with GANGNAM STATION (LINE NO. 2) 5821 as a subway station name tree for each line.

In operation 5830, the name retrieving system may provide a subway station exit number list 5831 of GANGNAM STATION (LINE NO. 2) selected from the subway station name tree for each line.

In operation 5840, the name retrieving system may select 'EXIT NO. 1' 5841 from the subway station exit number list 5831 and set 'EXIT NO. 1' 5841 as a search target location and a search point.

As described above, according to the present invention, it is possible to verify a subway station name tree through subway station name search and provide a search result associated with a subway station exit number that a user desires to retrieve as a search target location from a subway station exit number list.

The embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

According to the present invention, there is provided a name retrieving method and system that can define a relation between POIs as a POI relation when retrieving a destination name and thereby can provide a search result in a tree structure.

Also, according to the present invention, there is provided a name retrieving method and system that can define a relation between an apartment POI and an apartment entrance POI when retrieving an apartment name and provide a search result to thereby enable a user to readily identify an apartment location and an apartment entrance location.

Also, according to the present invention, there is provided a name retrieving method and system that can define a relation between POIs and provide a search result in the tree structure in order to prevent the search result from being incompletely displayed when a name is long.

Also, according to the present invention, there is provided a name retrieving method and system that can classify at least two equivalent names for each type and thereby provide a name search result when the at least two equivalent names are retrieved as the search result.

Also, according to the present invention, there is provided a name retrieving method and system that can define a relation between POIs located in a facility and thereby can provide a search result in the tree structure when retrieving a search target name.

Also, according to the present invention, there is provided a name retrieving method and system that can prevent the same facility from being recognized as a different facility.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A name retrieving method at a name retrieving system using a tree structure, the method comprising:

analyzing map data including the name of search target by the name retrieving system and defining by the name retrieving system a relation between points of interest (POIs) associated with the name as a POI relation; and providing a name search result by the name retrieving system in the tree structure based on the POI relation when a name is retrieved, wherein when a plurality of same names is retrieved in the same region as the search result of the name, the defining by the name retrieving system classifies the plurality of same names for each category of information to thereby define the POI relation.

2. The method of claim 1, wherein the defining by the name retrieving system classifies display point (DP) coordinates and guide point (GP) coordinates to thereby define the POI relation.

3. The method of claim 2, wherein the providing by the name retrieving system displays a location of the POI based on the DP coordinates and provides a search result of a route to the search target based on the GP coordinates.

4. The method of claim 1, wherein the providing by the name retrieving system receives a search request for the name, receives a selection on regional information in the tree structure based on the name, and provides a list associated with the selected regional information.

5. The method of claim 4, wherein the list includes a regional information list associated with the name.

6. The method of claim 5, wherein the regional information list associated with the name includes an apartment district number list or a subway station exit number list.

7. A non-transitory computer-readable recording medium storing a program for implementing the method according to claim 1.

8. A name retrieving system, comprising:

a POI relation defining unit to analyze map data including a name of a search target and define a relation between POIs associated with the name as a POI relation; and a search result providing unit to provide a name search result in the tree structure based on the POI relation when a name is retrieved wherein when a plurality of same names is retrieved in the same region as the search result of the name, the POI relation defining unit classifies the plurality of same names for each category of information to thereby define the POI relation.

9. The system of claim 8, wherein the POI relation defining unit classifies DP coordinates and GP coordinates to thereby define the POI relation.

10. The system of claim 9, wherein the search result providing unit displays a location of the POI based on the DP coordinates and provides a search result of a route to the search target based on the GP coordinates.

11. The system of claim 8, wherein the search result providing unit receives a search request for the name, receives a selection on regional information in the tree structure based on the name, provides a list associated with the selected regional information, and sets a search point and a destination location in the selected regional information.

12. The system of claim 11, wherein the list includes a regional information list associated with the name.

* * * * *